(12) United States Patent
Bertrand et al.

(10) Patent No.: US 12,035,347 B2
(45) Date of Patent: *Jul. 9, 2024

(54) MEDIUM ACCESS CONTROL SCHEDULERS FOR WIRELESS COMMUNICATION

(71) Applicant: Texas Instruments Incorporated, Dallas, TX (US)

(72) Inventors: Pierre Bertrand, Antibes (FR); Jing Jiang, Wellesley, MA (US); Michael Livshitz, Rockville, MD (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,201

(22) Filed: Nov. 22, 2021

(65) Prior Publication Data

US 2022/0159672 A1    May 19, 2022

Related U.S. Application Data

(63) Continuation of application No. 16/127,019, filed on Sep. 10, 2018, now Pat. No. 11,184,905, which is a continuation of application No. 13/455,463, filed on Apr. 25, 2012, now Pat. No. 10,075,969.

(60) Provisional application No. 61/478,604, filed on Apr. 25, 2011.

(51) Int. Cl.
*H04W 72/542* (2023.01)

(52) U.S. Cl.
CPC .................................. *H04W 72/542* (2023.01)

(58) Field of Classification Search
CPC .................................................. H04W 72/1231
See application file for complete search history.

(56) References Cited

U.S. PATENT DOCUMENTS

| | | | |
|---|---|---|---|
| 8,090,382 B2 | 1/2012 | Park et al. | |
| 8,259,583 B2 | 9/2012 | Almutairi et al. | |
| 8,351,359 B2 | 1/2013 | Heo et al. | |
| 8,412,249 B2 | 4/2013 | Cheng et al. | |
| 8,457,056 B2 | 6/2013 | Zhang et al. | |
| 8,503,388 B2 | 8/2013 | Ishii et al. | |
| 8,767,647 B2 | 7/2014 | Heo et al. | |
| 10,075,969 B2 | 9/2018 | Bertrand | |
| 10,419,191 B2 | 9/2019 | Dutta et al. | |
| 11,184,905 B2 * | 11/2021 | Bertrand | H04W 72/1231 |
| 2009/0262695 A1 | 10/2009 | Chen et al. | |
| 2010/0008326 A1 | 1/2010 | Albanese et al. | |

(Continued)

OTHER PUBLICATIONS

3GPP TS 36.211 v9.1.0, Mar. 2010, 3rd Generation Partnership Project; "Technical Specification Group Radio Access Network; Evolved Universal Terrestrial Radio Access (E-UTRA); Physical Channels and Modulation (Release 9)" (85 pages).

(Continued)

*Primary Examiner* — Donald L Mills
(74) *Attorney, Agent, or Firm* — Gregory J. Albin; Frank D. Cimino

(57) ABSTRACT

Wireless communication between a base station and at least one user equipment comprises the following. Each user equipment periodically measures channel quality of communication with the base station and transmits a channel quality indicator to the base station. The base station schedules communication with the at least one user equipment based upon the periodically transmitted channel quality indicators.

44 Claims, 21 Drawing Sheets

(56) References Cited

U.S. PATENT DOCUMENTS

| | | |
|---|---|---|
| 2010/0034158 A1 | 2/2010 | Meylan |
| 2010/0113082 A1 | 5/2010 | Ishii et al. |
| 2010/0311437 A1 | 12/2010 | Palanki et al. |
| 2011/0136528 A1 | 6/2011 | Sugawara et al. |
| 2011/0207467 A1 | 8/2011 | Hanaki et al. |
| 2011/0222455 A1* | 9/2011 | Hou ............... H04W 52/24 375/232 |
| 2011/0305179 A1 | 12/2011 | Wang et al. |
| 2012/0113904 A1 | 5/2012 | Anderson et al. |
| 2013/0010964 A1 | 1/2013 | Fong et al. |
| 2014/0161108 A1 | 6/2014 | Lohr et al. |
| 2016/0309460 A1* | 10/2016 | Heo ............... H04W 72/0413 |
| 2017/0013612 A1* | 1/2017 | Nayeb Nazar .... H04W 72/0446 |
| 2017/0126298 A1 | 5/2017 | Einhaus et al. |
| 2017/0195020 A1* | 7/2017 | Ko ............... H04B 7/0632 |
| 2017/0331577 A1 | 11/2017 | Parkvall et al. |
| 2018/0007677 A1 | 1/2018 | Seo et al. |
| 2019/0230701 A1 | 7/2019 | Golitschek Edler Von Elbwart et al. |

OTHER PUBLICATIONS

3GPP TS 36.321 v9.0.0, Sep. 2009, 3rd Generation Partnership Project; "Technical Specification Group Radio Access Network; Evolved Universal Terrestrial Radio Access (E-UTRA); Medium Access Control (MAC) protocol specification (Release 9)" (47 pages).

3GPP TS 36.213 v9.1.0, Mar. 2010, 3rd Generation Partnership Project; "Technical Specification Group Radio Access Network; Evolved Universal Terrestrial Radio Access (E-UTRA); Physical Layer Procedures (Release 9)" (79 pages).

3GPP TS 23.203 v8.5.0, Mar. 2009, 3rd Generation Partnership Project; "Technical Specification Group Services and System Aspects; Policy and charging control architecture (Release 8)" (113 pages).

M. Andrews, K. Kumaran, K. Ramanan, A. Stolyar, P. Whiting and R. Vijayakumar, "Providing Quality of Service over a Shared Wireless Link"; IEEE Comm. Magazine, 2001 (5 pages).

G. Song, and Y. Li, "Cross-Layer Optimization for OFDM Wireless Networks-Part 1: Theoretical Framework"; IEEE Trans. on Wireless Comm., Mar. 2005 (11 pages).

J. Lim, H. G. Myung, K. Oh and D.J. Goodman, "Proportional Fair Scheduling of Uplink Single-Carrier FDMA Systems"; 17th Annual IEEE International Symposium on Personal, Indoor and Mobile Radio Communications (PIMRC) 2006 (6 pages).

H. Kim, K. Kim, Y. Han, and S. Yun; "A Proportional Fair Scheduling for Multicarrier Transmission Systems"; IEEE VTC Fall 2004 (5 pages).

Mohammed Al-Rawi, Riku Yintti, Johan Torsner, Mats Sagfors; "Opportunistic Uplink Scheduling for 3G LTE Systems", IT 2007, 2008 IEEEd (5 pages).

Patrick A. Hosein; "QoS Control for WCDMA High Speed Packet Data"; IEEE MWCN 2002 (5 pages).

T. E. Kolding; "QoS-Aware Proportional Fair Packet Scheduling with Required Activity Detection"; VTC Fall 2006 (5 pages).

M. Anas, C. Rosa, F.D. Calabrese, K. I. Pedersen, and P.E. Mogensen: "Combined Admission Control and Scheduling for QoS Differentiation in LTE Uplink"; VTC Fall 2008 (5 pages).

Ericsson; "R1-031303 System level evaluation of OFDM-further considerations", TSG-RAN WG1 #35, Lisbon, Portugal, Nov. 17-21, 2003 (6 pages).

Motorola; "R1-050718 EESM Link Error Prediction for EUTRA System Evaluation", 3GPP TSG-RAN WG1 #42, London, UK, Aug. 29-Sep. 2, 2005 (14 pages).

Panasonic; "R1-080133 System level analysis for CCE aggregation size dependent transport format signaling"; 3GPP TSG-RAN WG1 #51 bis; Sevilla, Spain, Jan. 14-18, 2008 (4 pages).

Kristina Jersenius, "Uplink channel dependent scheduling for future cellular systems"; Master thesis, Linkoping University and Ericsson Research 2007 (83 pages).

Calabrese, F.D.; Michaelsen, P.H.; Rosa, C.; Anas, M.; Castellanos, C.U.; Villa, D.L.; Pedersen, K.I.; Mogensen, P.E., "Search—Tree Based Uplink Channel Aware Packet Scheduling for UTRAN LTE", VTC Spring 2008 (5 pages).

F.D. Calabrese, C. Rosa, M. Anas, P.H. Michaelsen, K.I. Pedersen, P.E. Mogensen, "Adaptive Transmission Bandwith Based Packet Scheduling for LTE Uplink"; VTC Fall 2008 (5 pages).

Luis Angel Maestro Ruiz de Temino, Gilberto Berardinelli, Simone Frasttasi and Preben Mogensen, "Channel-Aware Scheduling Algorithms for SC-FDMA in LTE Uplink"; PIMRC 2008 (6 pages).

Fang Liu, Xiaoming She, Lan Chen, Hiroyuki Otsuka, "Improved Recursive Maximum Expansion Scheduling Algorithms for Uplink Single Carrier FDMA System"; VTC Spring 2010 (5 pages).

H. Ekstrom, A. Furuskar, J. Karlsson, S. Meyer, S. Parkvall, J. Torsner, and M. Wahlqvist; "Technical solutions for the 3g long-term evolution"; IEEE Communications Magazine, 44, Mar. 2006 (8 pages).

F. D. Calabrese, C. Rosa, K. I. Pedersen, P.E. Mogensen; "Performance of Proportional Fair Frequency and Time Domain Scheduling in LTE Uplink"; EW 2009 (5 pages).

T. Shi, S. Zhou, Y. Yao, "Capacity of single carrier systems with frequency-domain equalization", IEEE 6th CAS Symp. on Emerging Technologies: Mobile and Wireless Comm, Shanghai, China, May 31-Jun. 2, 2004 (4 pages).

Y. Ofuji, A. Morimoto, H. Atarashi, and M. Sawahashi; "Sector Throughout Using Frequency-and-Time Domain Channel-Dependent Packet Scheduling with Channel Prediction in OFDMA Downlink Packet Radio Access"; VTC 2005 Fall (5 pages).

C. U. Castellanos, F. D. Calabrese, K. I. Pedersen and C. Rosa; Uplink Interference Control in UTRAN LTE Based on the Overload Indicator; VTC 2008-Fall (5 pages).

M. Boussif, N. Quintero, F.D. Calabrese, C. Rosa, and J. Wigard; "Interference Based Power Control Performance in LTE Uplink"; ISWCS 2008 (5 pages).

C. U. Castellanos, D. L. Villa, C. Rosa, K. I. Pedersen, F. D. Calabrese, P. H. Michaelsen and J. Michel; "Performance of Uplink Fractional Power Control in UTRAN LTE"; IEEE VTC Spring 2008 (5 pages).

Anil M. Rao; "Reverse Link Power Control for Managing Inter-cell Interference in Orthogonal Multiple Access Systems"; IEEE VTC Fall, 2007 (5 pages).

A.Simonsson and A. Furuskar; "Uplink Power Control in LTE—Overview and Performance"; IEEE VTC Fall, 2008 (5 pages).

Bilal Muhammad and Abbas Mohammed; "Performance Evaluation of Uplink Closed Loop Power Control for LTE System"; IEEE VTC Fall, 2009 (5 pages).

G. H. Golub, C. F. Van Loan, "Matrix Computations", Johns Hopkins, 3rd edition, 1996, pp. 140-151.

U.S. Appl. No. 13/455,463, filed Apr. 25, 2012 to Aug. 24, 2018 (808 pages).

U.S. Appl. No. 16/127,019, filed Sep. 10, 2018 to Nov. 3, 2021 (521 pages).

\* cited by examiner

MEDIUM ACCESS CONTROL SCHEDULERS FOR WIRELESS COMMUNICATION

CLAIM OF PRIORITY

This application is a continuation of U.S. application Ser. No. 16/127,019, filed Sep. 10, 2018, which is a continuation of U.S. application Ser. No. 13/455,463, filed Apr. 25, 2012, which claims the benefit of U.S. Provisional Application No. 61/478,604, filed Apr. 30, 2010.

TECHNICAL FIELD OF THE INVENTION

The technical field of this invention is wireless communication such as wireless telephony.

BACKGROUND OF THE INVENTION

The present embodiments relate to wireless communication systems and, more particularly, to the transmission of Physical Downlink Shared Channel (PDSCH) data and Physical Uplink Shared CHannel (PUSCH) data in multi-input multi-output (MIMO) transmissions.

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver. Among these are Cell-specific Channel State Information Reference Signals (CSI-RS) and Dedicated or Demodulating Reference Signals (DMRS) in downlink, and user-specific Sounding Reference Signal (SRS) in uplink. These reference signals are useful for channel estimation at the receiver.

SUMMARY OF THE INVENTION

Wireless communication between a base station and at least one user equipment comprises the following. Each user equipment periodically measures channel quality of communication with the base station and transmits a channel quality indicator to the base station. The base station schedules communication with the at least one user equipment based upon the periodically transmitted channel quality indicators.

The base station schedules uplink transmissions from a user equipment to the base station. The base station receives a channel quality indicator of each physical resource block, computes a scheduling metric for each receiver type, and limits the size of uplink allocation based upon reported headroom and buffer size.

Each user equipment signals the base station a scheduling recommendation regarding Modulation and Coding Scheme and Multiple Input, Multiple Output configuration. The base station schedules downlink transmissions from the base station to a user equipment in response to the recommendations.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
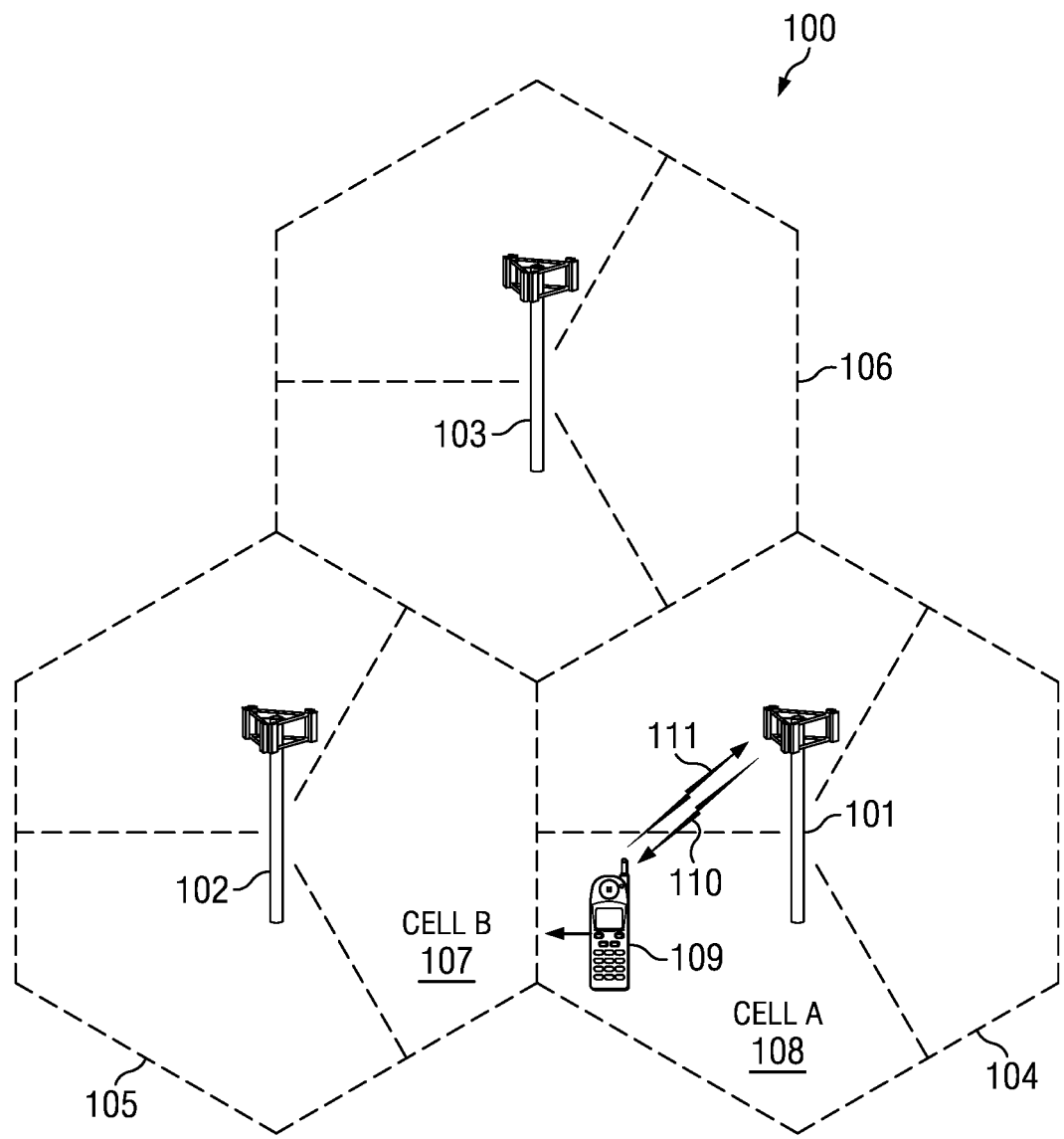
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

Figure 2:
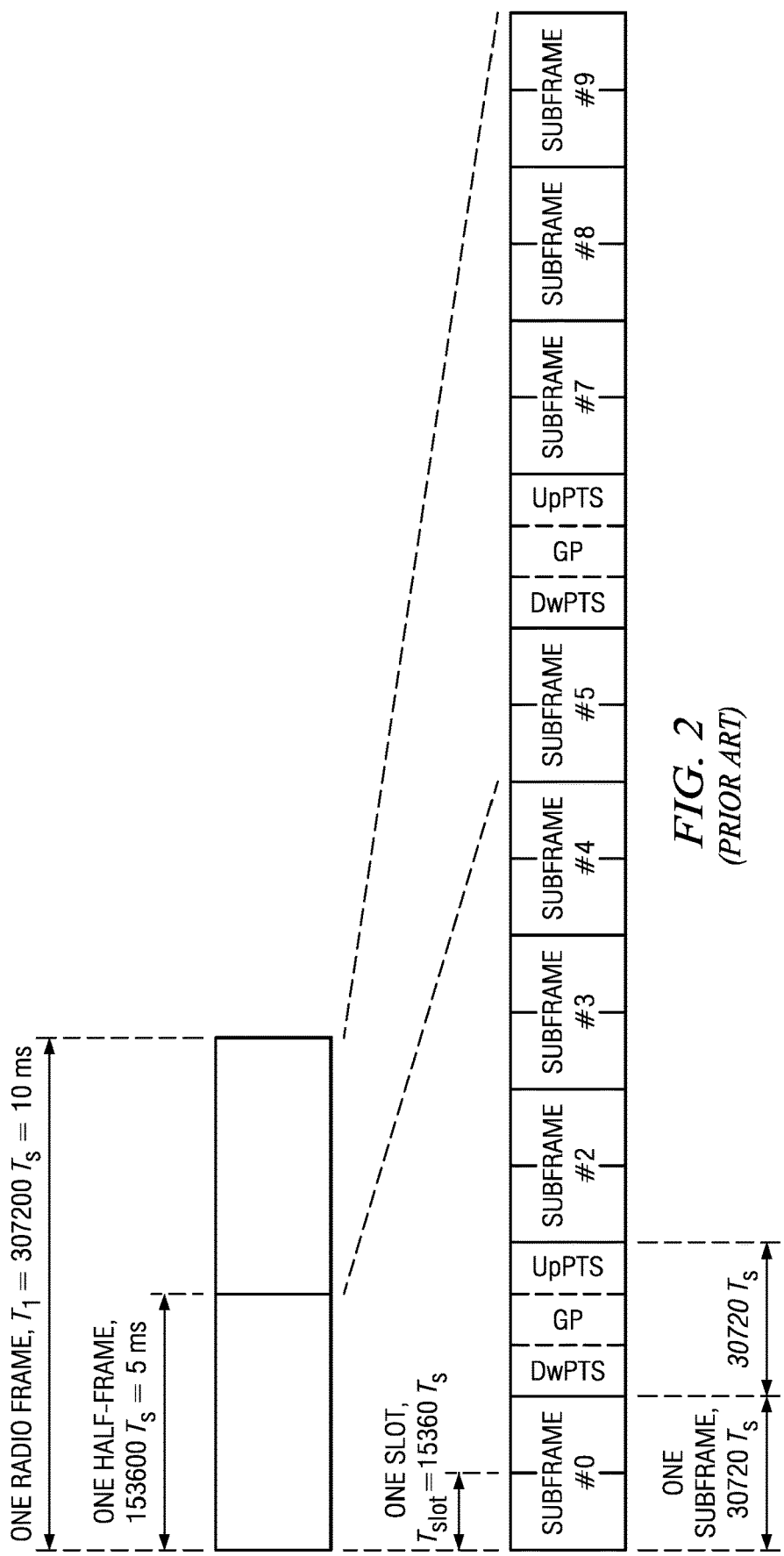
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Configuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Long Term Evolution (LTE) wireless networks, also known as Evolved Universal Terrestrial Radio Access Network (E-UTRAN), were standardized by the 3GPP working groups (WG). OFDMA and SC-FDMA (single carrier FDMA) access schemes were chosen for respective the down-link (DL) and up-link (UL) of E-UTRAN. User Equipments (UEs) are time and frequency multiplexed on a physical uplink shared channel (PUSCH) and a physical uplink control channel (PUCCH) and time and frequency synchronization between UEs guarantees optimal intra-cell orthogonality. This access scheme allows greater bandwidth efficiency with dynamic frequency aware radio resource allocation as compared to Wideband Code Division Multiplex Access (WCDMA). Allocation decisions are made by LTE scheduler, taking into account: instantaneous channel conditions; the traffic situation; and Quality of Service (QoS) requirements.

LTE scheduler design must address two main independent issues: defining a scheduler metric; and defining a sub-optimal search algorithm trading-off complexity and approximation of the optimal solution Proportional Fair (PF) is widely used for the first issue although realistic implementations also complement it with QoS-based metrics to address real-time and Guaranteed Bit Rate (GBR) radio bearers. The second issue of sub-optimal search algorithms, is the focus of most research papers. The complexity of a scheduling algorithm is driven by the computational cost of single scheduling hypothesis and the number of hypotheses investigated. Practical simulation results do not justify high complexity algorithms. The Recursive Maximum Expansion (RME) algorithm for UL seems to adequately address this trade-off. A 2-step approach of time domain pre-selection and then frequency domain packet scheduler (FDPS) on the pre-selected users addresses the performance/complexity trade-off by reducing the total number of UEs available for multiplexing in Frequency Domain (FD) so as to limit the complexity of the FDPS scheduler.

This invention is a Medium Access Control (MAC) scheduler algorithms that provides close to optimal performance while maintaining reasonable processing requirements.

Figure 3:
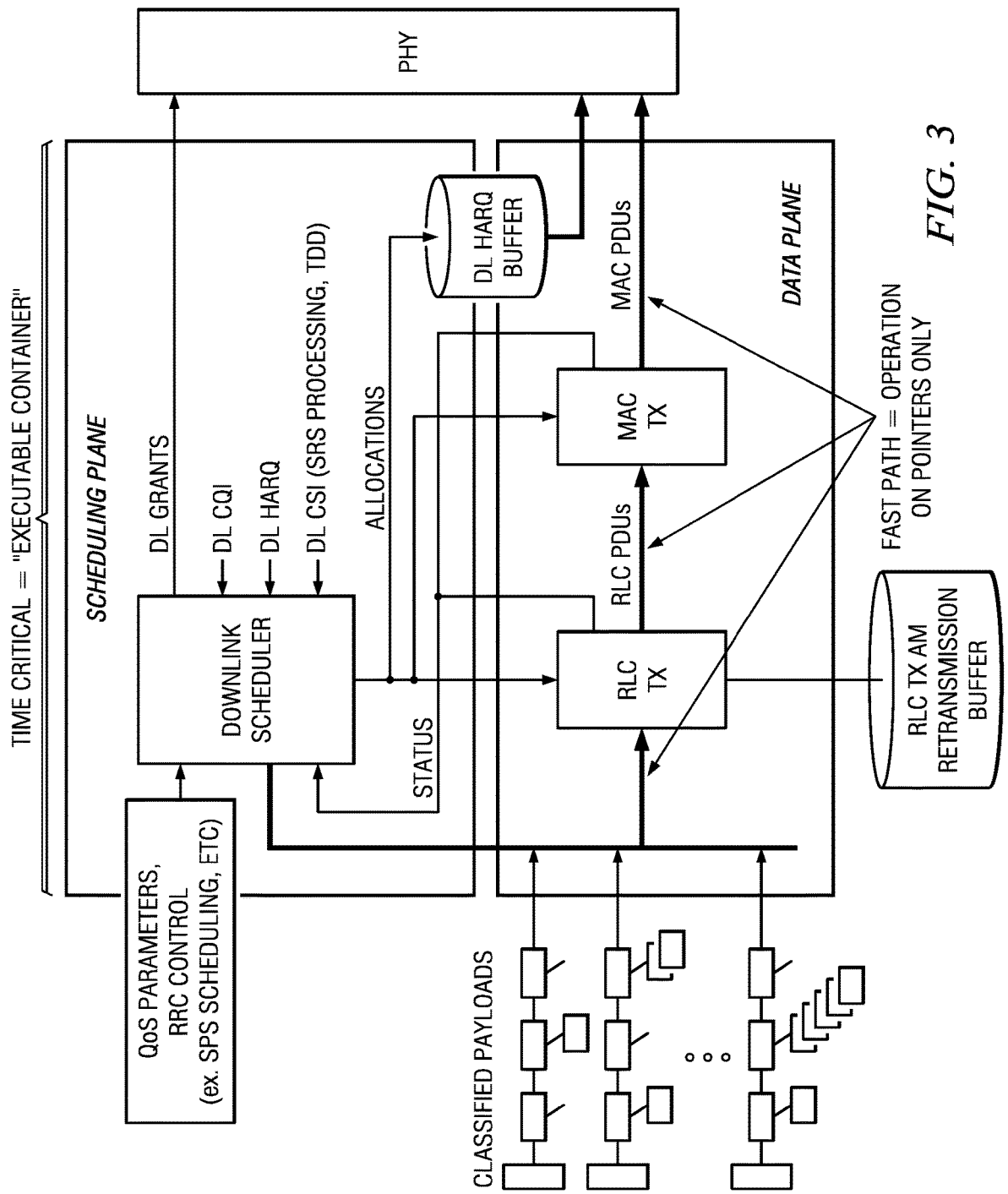
FIG. 3 illustrates a simplified overall L2 architecture overview of downlink operation.
Figure 4:
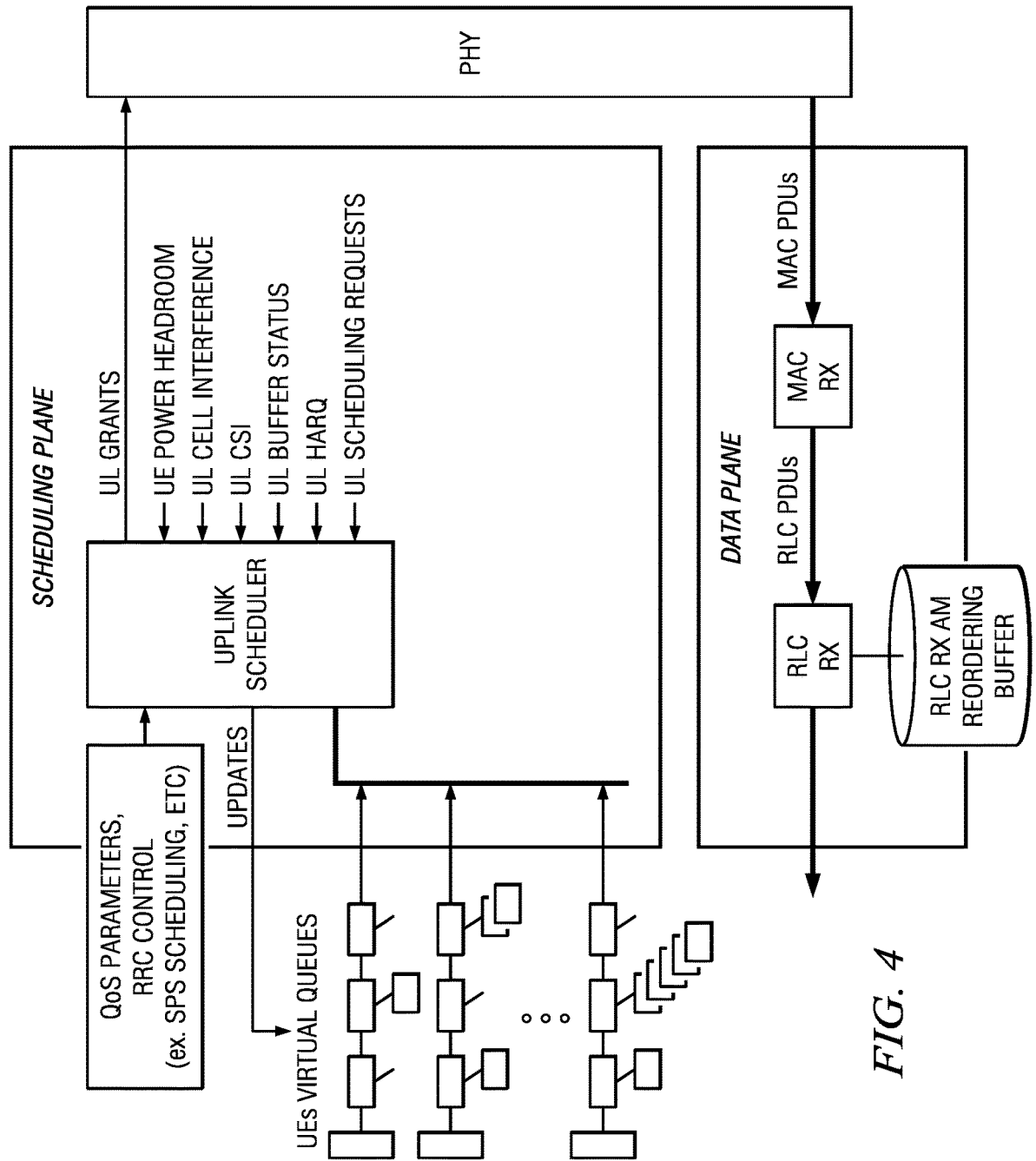
FIG. 4 illustrates a simplified overall L2 architecture overview of uplink operation.

FIGS. 3 and 4 illustrate a simplified overall L2 architecture overview. FIG. 3 illustrates downlink and FIG. 4 illustrates uplink. They illustrate in particular the central position of the scheduler, which controls all other L2 sub-layers. The scheduler operates in DL on classified payloads delivered by the Packet Data Convergence Protocol (PDCP) transmit (TX) and in UL on UEs virtual queues generated and maintained from UL resource information such as buffer status, power headroom, and scheduling request.

Figure 5:
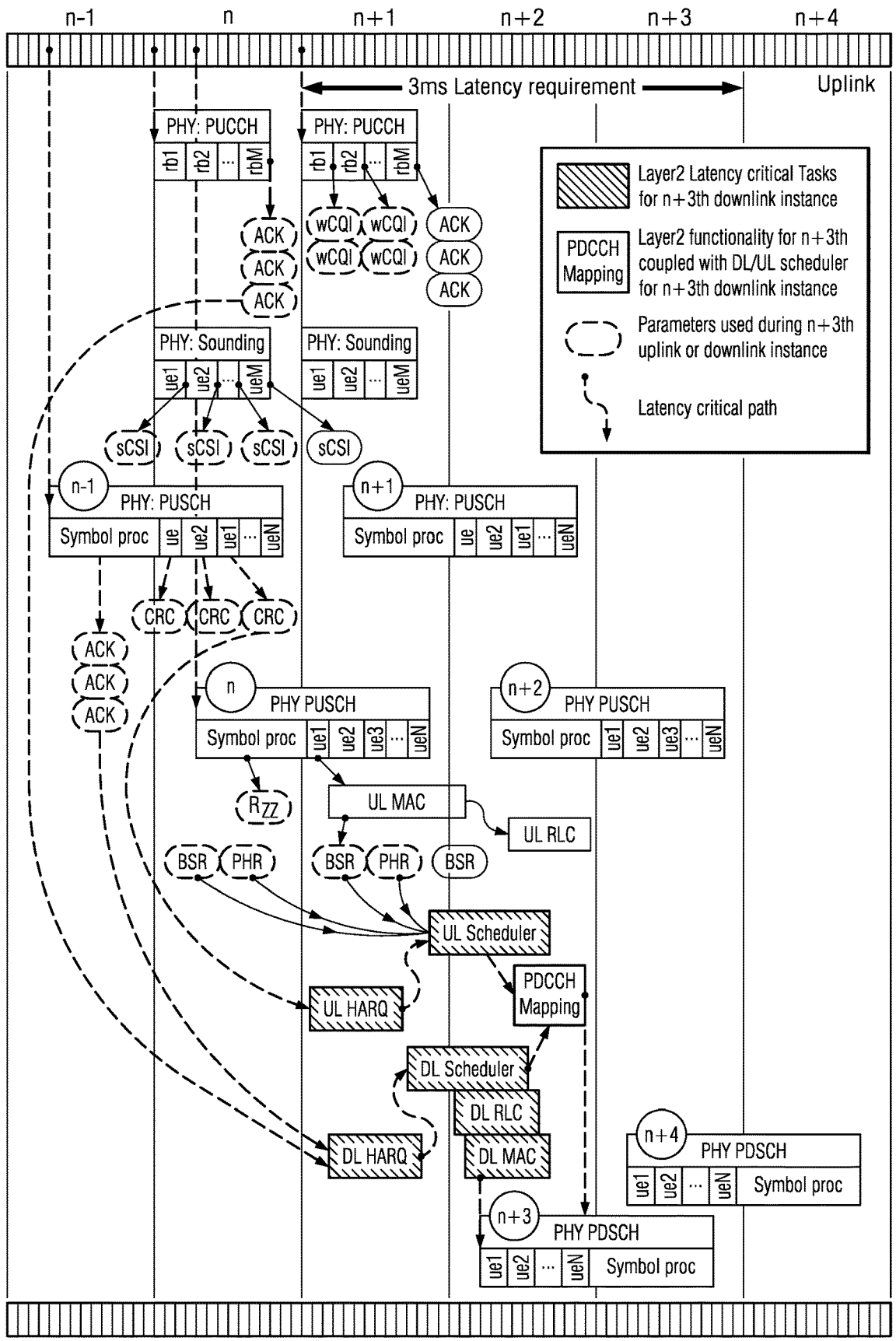
FIG. 5 illustrates a timing diagram of the eNB latency requirements.

FIG. 5 illustrates an overview of the latency requirements. The L2 tasks take part of the overall 3 ms eNB latency budget. In FIG. 5 tasks durations and overlaps are only illustrative and do not reflect measured latencies.

In Downlink once a scheduling decision has been made, the goal is to deliver associated transport blocks (TBs) to Physical Layer (PHY) as soon as possible. This gives the PHY maximum possible time to meet the Transmission Time Interval (TTI) processing deadlines. TBs are delivered to PHY one or two Multiple Input, Multiple Output (MIMO) signals at a time as they become available. The order TBs are delivered is preferably: Random Access Response; Semi-persistent Scheduling SPS including no scheduling work only Radio Link Control (RLC)/(MAC); Signalling Radio Bearers (SRBs) followed by Guaranteed Bit Rates (GBRs) then non-GBRs Radio Bearers (DRBs); and lastly Hybrid Automatic Repeat Request (HARD) which needs no processing.

Delivering TBs to PHY is the time-critical portion of the DL L2 stack and will execute one allocation at a time. The functionality of this executable container illustrated in FIG. 3 is equivalent to RLC-MAC data plane of single L2 UE. This includes: Single Input Queue and the method to queue the packets from different radio bearers (RBs) into it; Multi-LCID Radio Link Control (RLC); UE-equivalent MAC; and TB(s) output queue to PHY. The rest of the L2 stack such as time-out and message driven will execute at background in the time left over from real-time containers. The container is triggered by allocation decision from eNB Downlink Scheduler. Prior to triggering, the Scheduler places the packets into the container input queue. There shall be minimal context switching within a container. Once container is triggered, it preferably runs to completion. Most of the time all the container data is consumed and assembled into transmit block(s). It is possible to run multiple containers concurrently which is called multi-core implementations.

In the Uplink the only time-critical module is the MAC Receiver (RX). RLC RX can service all LCIDs from all UEs at lower priority. PDCP RX can service all RBs from all UEs at the same low priority after the RLC RX has completed.

If they share the same processing resource, such as digital signal processor (DSP) core, the DL scheduler runs first and then UL scheduler. One reason for that is, as illustrated in FIGS. 3, 4 and 5. The DL scheduler has a tougher time criticality since its scheduling decisions further trigger the construction of the MAC Protocol Data Units (PDUs) of the scheduled users, whereas the UL scheduling decisions only trigger mapping the associated grants on the physical Downlink Control CHannel (PDCCH) within the same deadline. Starting the UL scheduler later in the sub-frame allows it to profit from the latest SRS measurements performed by L1 on the previous sub-frame. These SRSs are the last symbol of the sub-frame as SRS processing is scheduled last in the L1 tasks.

This patent application makes the following Scheduling Policies assumptions. The Paging Channel (PCH), Broadcast Channel (BCH) and Random Access Channel (RACH) responses are mapped onto respective PCCH, BCCH, and CCCH logical channels. These use the RLC TM mode and cannot be segmented. Thus they have to go through in one shot with no ARQ/HARQ processing. Thus they are prioritized over other transmissions. Then come HARQ adaptive retransmissions, MAC control elements and aperiodic Channel Quality Indicator (CQI) reports which also cannot be segmented. Then comes RACH Msg3, scheduling requests and UEs SRB1/2 which are prioritized over other remaining radio bearers. Then comes SPS allocations which are typically Voice over Internet Protocol (VoIP) made by Radio Resource Management (RRM) based on average UE Signal to Interference plus Noise Ratio (SINR) which are known to the dynamic scheduler. Then comes GBR Traffic first selecting a radio bearer with pending traffic and then finding best set of physical resource blocks which are continuous for UL to carry it. Lastly comes non-GBR Traffic operating on resource blocks continuous for UL. These search for best UEs with pending traffic using joint time-frequency PF scheduling.

The scheduler makes allocation and link adaptation decisions according to the following rules. Allocation and link adaptation decisions use CQI-based metrics. The UL gets the knowledge of each physical resource block channel state information (CSI) and noise variance from SRS and DMRS processing by L1, and computes associated CQI-based scheduling metric assuming a given receiver type. Reported power headroom and buffer size are taken into consideration by limiting the size of uplink UE allocation. The DL uses available CQI reports and follows the UEs recommendation regarding Modulation and Coding Scheme (MCS) and MIMO configuration. The Link adaptation employs a-priori knowledge of the mapping between modulation and coding rate transmission parameters, channel SINR and expected Block Error Rates (BLERs) allowing the dynamic scheduler to adapt transmission mode reaching either the target BLER or maximum throughput. The Scheduler is constrained with the capacity of PDCCH channel to carry allocation announcements. It adapts the PDCCH transmission parameters and searches through user-specific and common search spaces to allocate Control Channel Elements (CCE) for Downlink Control Information (DCI) messages.

This patent application makes the following other assumptions. Both adaptive and non-adaptive HARQ retransmissions can be configured for each radio bearer except SRB0. This configuration may depend on the QoS of the RB. However, a typical configuration can be: adaptive for VOIP semi-persistent allocations; non-adaptive for dynamic allocations. Discontinuous Reception (DRX) management is considered outside the scope of the dynamic scheduler.

Figure 6:
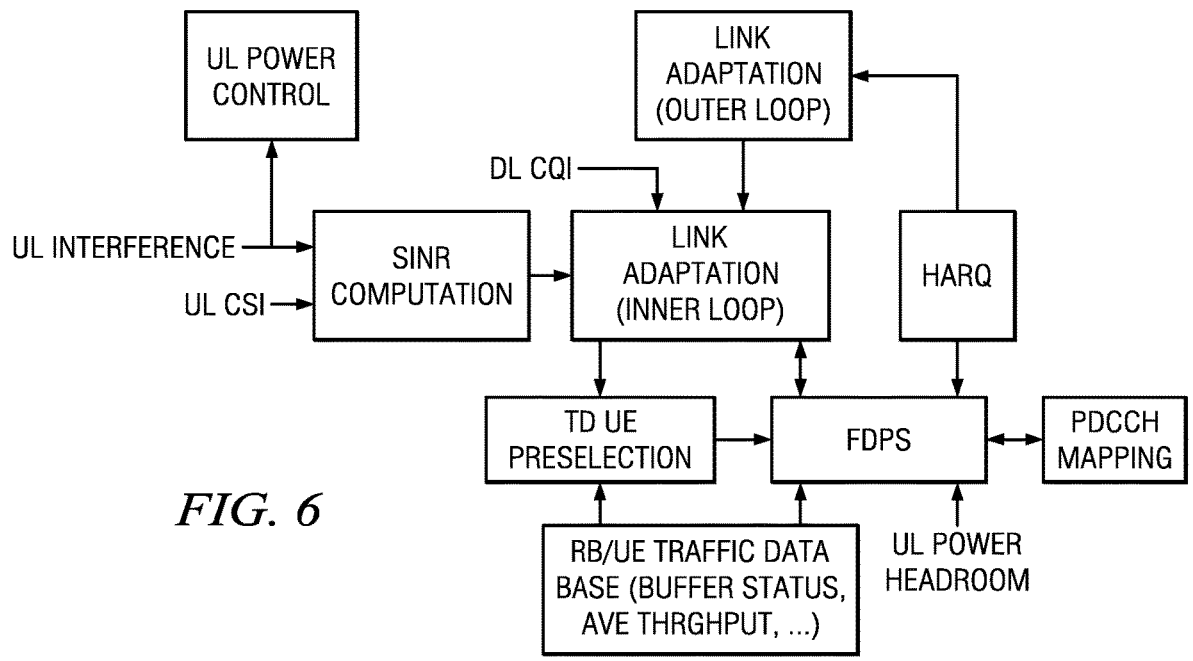
FIG. 6 is a simplified block diagram of scheduler functions.

FIG. 6 illustrates the various functions involved in the schedule. The medium filled blocks are functions devoted to UL scheduler. The light filled blocks are functions devoted to the DL scheduler.

The LTE scheduler can be split into a 2-step procedure. The first step is a time domain (TD) pre-selection performed based on wideband CQI and possibly some QoS criterions. The second step is a frequency domain packet scheduler (FDPS) computes allocation decisions on the pre-selected users. One motivation of such a 2-step procedure is to reduce the total number of UEs available for multiplexing in FD. This limits the complexity of the FD packet scheduler (FDPS). Another motivation is because of control channel limitation regarding the number of UEs that can be simultaneously scheduled in each TTI.

Figure 7:
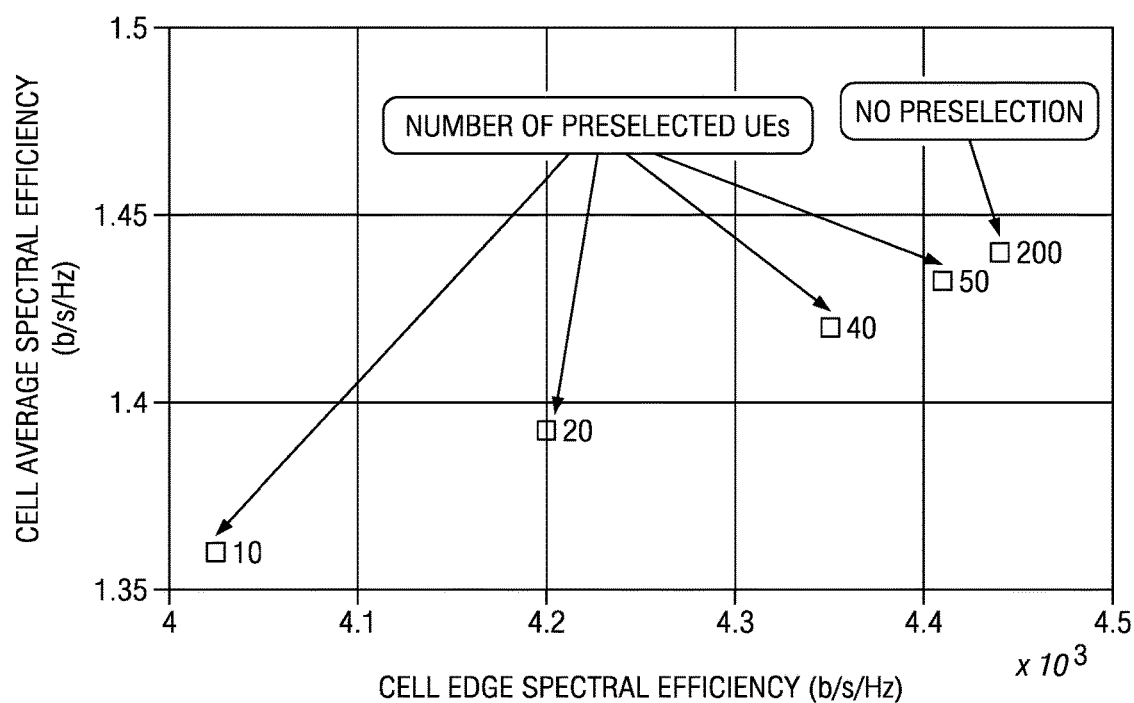
FIG. 7 illustrates a plot of the spectral efficiency performance degradation of a 2-step scheduling approach used for the UL scheduling.

Given the larger complexity of the UL scheduler compared to the DL scheduler, this preselection is made for UL scheduling only and for a large enough number of active users (few hundreds). Careful choice of the number of preselected users must be made to not lose too much performance. FIG. 7 plots the spectral efficiency performance degradation of this 2-step scheduling approach when used for the UL scheduling. FIG. 7 shows that preselecting at least 50 users out of 200 does not yield significant performance degradation compared to no preselection. FIG. 7 further illustrates that preselelcting 20 or 10 UEs shows observable limitations. Thus it is preferable to preselect 50 users for the LTE UL scheduler in a macro cell configuration where the number of users is in the range of 200. For a pico cell configuration with up to 64 active users, no UE preselection is performed. Table 2 lists the system simulation parameters used in generating FIG. 7.

TABLE 2

System Simulation Parameters

| | |
|---|---|
| Numerology | 10 MHz (40 PRBs for PUSCH) |
| Test case | 3GPP case 1 |
| Cell Layout | Wrap-around with 21 cells |
| Active users per cell | 200 |
| Rx antennas | 2 |
| Channel model | SCM 3D Urban Macro |
| Channel estimation | Ideal + 1.5 dB penalty |
| UE speed | 3 km/h |
| Equalizer | MMSE w/t MRC |
| Traffic Model | Full Buffer |
| Scheduling delay | 8 ms |
| SRS period | 10 ms |
| Power Control | FPC with $P_{0\_PUSCH} = -86$ dBm and $\alpha = 0.8$ |
| Scheduler | PF TD + PF/RME FDPS |
| Allocation granularity | 4 PRBs |

Practical MAC schedulers may use larger than per-PRB frequency granularity corresponding to the minimum frequency band of a users allocation. This is referred to as scheduling unit and defined in integer number NRB of Physical Resource blocks (PRBs). Each active user competes for a scheduling unit resource with a scheduling metric also referred to as Utility Function. The Proportional Fair (PF) metric for each scheduling unit b and competing user u is computed in the FDPS as:

$$\rho_{u,b}(t) = \frac{r_{u,b}(t)}{T_u(t)} \quad (1)$$

where: $r_{u,b}(t)$ and $T_u(t)$ are the respective achievable instantaneous data rate for user u on scheduling unit b in the $t^{th}$ scheduling period and the average data rate of user u at the $t^{th}$ scheduling period. $T_u(t)$ is estimated/updated through Infinite Impulse Response (IIR) filtering on every subframe for each UE based on the instantaneous rate $r_u(t)$ achieved in the $t^{th}$ scheduling period.

$$\hat{T}_u(t) = \alpha \hat{T}_u(t-1) + (1-\alpha) r_u(t) \quad (2)$$

where: $0 \le \alpha \le 1$ is the forgetting factor of the IIR filter and can be tuned to monitor the averaging interval, thus allowing this metric to range between a fair-only to a Max C/I greedy scheduler. This parameter can be used to trade-off cell-edge spectral efficiency versus cell average spectral efficiency and is a UE specific configurable. Non-scheduled UEs will be assigned $r_u(t)=0$. Scheduled UEs are assigned $r_u(t)$ and can be validated either at allocation time or only once per each received associated HARQ ACK. In equation (1) only $r_{u,b}(t)$ varies across scheduling units. It is derived from the estimate SINR $\gamma_{MMSE}(b)$ through a link adaptation function described below. In the academic PF formula $r_{u,b}(t)$ reflects the achievable instantaneous data rate for user u on scheduling unit b but the predicted transport block size (TBS) provided by the link adaptation function plays exactly the same role and should be used instead. For SU-MIMO $r_{u,b}(t)$ and $T_u(t)$ represent the aggregated data rates of user u across its different MIMO streams. In the MU-MIMO case the PF metric for each scheduling unit b and competing user group (pair) A is computed by summing the PF metrics of the M (=2) users of the group:

$$\rho_{A,b}(t) = \sum_{u=1}^{M} \frac{r_{u,b}(t)}{T_u(t)} \quad (3)$$

In case a time-domain pre-selection is performed the PF metric is also used as pre-selection metric where $r_u(t)$ is no longer associated with a scheduling unit but reflects the achievable instantaneous data rate for user u across the full spectrum.

This PF metric can be further extended to address QoS requirement of packet delay and minimum throughput guarantees. This QoS is relevant to real-time data traffic such as gaming, live audio or video streams, and GBR bearers. Since these criterions have little impact on frequency domain scheduling, most associated metrics are directly inherited from cdma2000 HDR and HSPA and might be applied at the TD pre-selection stage only. The potential QoS-based extensions are: the Modified Largest Weighted Delay First (M-LWDF) algorithm; and the Barrier Function.

The Modified Largest Weighted Delay First (M-LWDF) algorithm applies on top of the max C/I scheduling metric a factor $\gamma_j W_j(t)$ where: $W_j(t)$ is the head-of-the-line packet delay for queue or user j; $\gamma_j$ are arbitrary positive constants. Alternately $W_j(t)$ can be replaced by the queue length. The M-LWDF scheduling algorithm is throughput optimal. Setting appropriately the values of $\gamma_j$ allows shaping the delay distributions of the different users. The problem of providing certain minimum throughput $r_i$ for each user can also be solved by the M-LWDF scheduling algorithm, if it is used in conjunction with a token bucket control.

The Barrier Function is proposed in order to provide QoS guarantees as well as take advantage of user diversity gains. Starting from the max Carrier-to-Interference Power Ratio (C/I) scheduler, a utility function also aiming at guaranteeing a minimum throughput $r_{min}$ is proposed as:

$$U(r) = r + (1 - e^{-\beta(r-r_{min})}); \quad U'(r) = 1 + 1 + \beta e^{-\beta(r-r_{min})} \quad (4)$$

When r drops below the minimum value then the gradient of the utility function rapidly decreases. Hence the scheduler would be forced to serve users with throughputs below the minimum. The parameter $\beta$ determines the rate at which the penalty for violating the constraint increases. This value should be based on the Service Class of the user.

An alternate metric controlling the average scheduling activity is $p_k$ of user k. They apply on top of the PF scheduling metric a factor $\eta_k[n]$ reflecting the required scheduling rate $\hat{\eta}_k[n]$ of the user:

$$\eta_k[n] = \hat{\eta}_k[n] = \frac{GBR_k}{T_{sched,k}[n]} \quad (5)$$

where: $T_{sched,k}$ is the average throughput measurement which is based only on the time instances when the user is actually scheduled. One benefit of this scheduler is that it is easily configured since the only parameter that needs be tuned is the averaging window for $T_{sched,k}$. This scheduler can support effective distribution of excess capacity to non-QoS or best-effort users, while better guaranteeing QoS compared to PF scheduling with barrier functions.

The inner loop link adaptation estimates for a given channel quality information (SINR) available at transmission interval n and on frequency chunk b, which modulation and coding scheme (MCS) out of a fixed MCS set, must be assigned to a user transmitting at transmission interval n+K. The MCS provides the transport block size (TBS) which directly yields or can be used instead of the achievable data rate $r_{u,b}(t)$ of the user at transmission interval n+K on frequency chunk b. Link Adaptation is driven by two different requirements, depending on the type of traffic being served. The first requirement is non-GBR, non time sensitive traffic: ad-hoc users such as ftp. This requirement seeks to maximize the throughput. The second requirement is dynamically scheduled time sensitive traffic such as SIP signaling, Signalling Radio Bearers (SRBs), Random Access Channel (RACH) response and message 3. This requirement seeks to guarantee some minimum Block Error Rate (BLER).

Figure 8A:
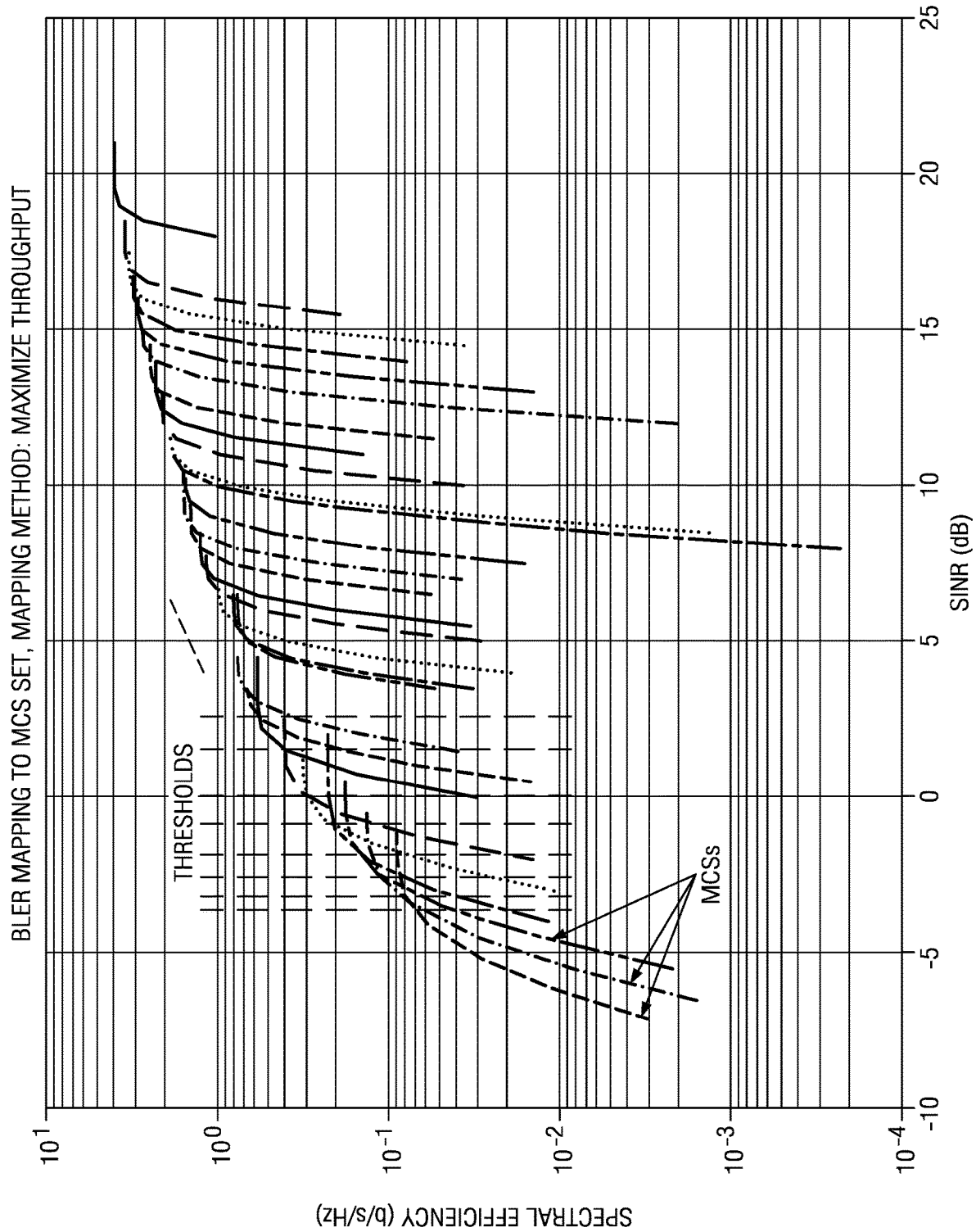
FIG. 8A illustrates the MCS selection maximum throughput versus spectral efficiency.

The Instantaneous throughput is typically approximated as $$TP = r_{u,b}(t) \times (1 - BLER) \quad (6)$$

where: BLER is the block error rate given the UEs SINR. FIG. 8A illustrates how the MCS selection reduces to a set of SINR thresholds derived from Additive White Gaussian Noise (AWGN) Single-Input Single-Output (SISO) link-level BLER performance pre-computed in a look up table (LUT) and reflecting the UL receiver performance of the eNB.

Figure 8B:
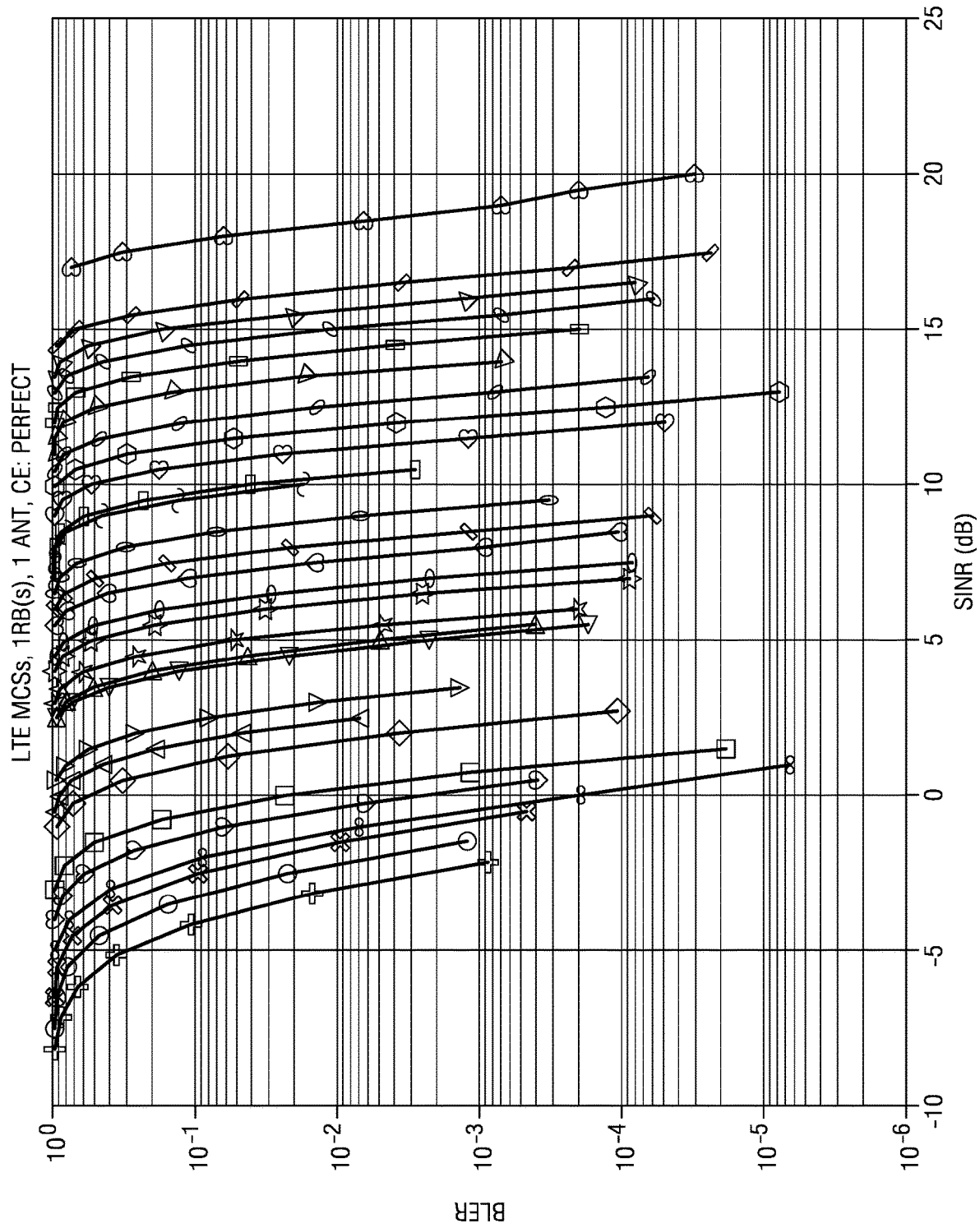
FIG. 8B illustrates the MCS selection maximum throughput versus block error rate.

In the Link Adaptation for achieving a Target BLER a BLER threshold is applied to the AWGN SISO link-level BLER performance pre-computed in LUT as illustrated in FIG. 8B.

FIG. 8 illustrates the AWGN SISO link-level BLER or throughput performance across the 29 MCSs available in LTE for 1 PRB allocation. There are as many LUTs available as allocation sizes.

The DL link adaptation uses the CQI reports from the UE. A CQI index specifies code rate r and modulation $Q_m$ corresponding to an efficiency in bits/symbol for this user on a given Resource Block Group (RBG). The efficiency reported in CQI which is independent of whether this RBG includes or not specific control channels and/or signals overhead is used as an instantaneous bit rate parameter to compute the scheduling metric for that UE on that RBG. When a UE k has been elected by scheduler for transmission on NRBG RBGs $\{g_0, g_1, \ldots, g_{N_{RBG}-1}\}$ the UE is link adapted as follows. The CQI indexes from each RBG are converted into SINRs $\gamma_g$ using AWGN SISO link-level BLER performance pre-computed in LUT similar to FIG. 8B except it is for DL. The SINR corresponds to abscissa value at 10% BLER for the curve associated with the MCS reported by the CQI index. Given the BLER LUT is expected to reflect the UE receiver performance, the eNB uses a standard BLER LUT set which is adapted on a UE basis by the outer loop Link Adaptation function.

The UE-common expected SINR $\gamma_k$ across the allocation is then derived through exponential Effective SIR Mapping (EESM) for OFDM averaging as follows:

$$\hat{\gamma}_k = -\beta \ln\left(\frac{1}{N_{RBG}} \sum_{g \in \{g_i\}} e^{-\frac{\gamma_g}{\beta}}\right) \quad (7)$$

where: the parameter β that can be adjusted to match the ESM to a specific modulation scheme or, in the general case, a specific combination of modulation scheme and coding rate. A suitable value for the parameter β for each modulation scheme and/or coding rate of interest can then be found from link-level simulations. This SINR is then used to derive through the same LUT as above the closest corresponding modulation $\hat{Q}_{m,k}$ and code rate $\hat{r}_k$ targets. Then the combination of transport block size and modulation scheme when applied to the actual allocated resource should result in the effective channel code rate which is the closest possible to $\hat{r}_k$. This is achieved as follows. The number of transmitted bits $n_b$ in the allocated resource is determined as:

$$n_b = \hat{Q}_{m,k}(N_{RBG} \times P \times 12 \times 2 \times N_{symb}^{DL} - N_{CRS} - N_{PBCH} - N_{PSS} - N_{SSS}) \quad (8)$$

where: P is the RBG size in PRBs; $N_{symb}^{DL}$ is the number of OFDM symbols in a downlink slot; and NCRS, NPBCH, NPSS and NSSS are the number of resource elements (RE) occupied by PBCH, PSS and SSS respectively in the allocation. The resulting effective channel code rate $r(TBS(\hat{Q}_{m,k}))$ associated with a transport block size $TBS(Q_m)$ is:

$$r(TBS(\hat{Q}_{m,k})) = \frac{TBS(\hat{Q}_{m,k})}{n_b} \quad (9)$$

The final transport block size $TBS(\hat{Q}_{m,k})$ provides the rate $r(TBS(\hat{Q}_{m,k}))$ closest to $\hat{r}_k$.

The Link Adaptation uses SINR estimates or CQI reports available at some time t to predict an instantaneous throughput at time t+τ. There is a prediction error which is addressed by applying some backoff to the SINR estimates and CQI reports at the Link Adaptation input. This backoff value is adapted in an outer loop at slow rate independently for each UE based on the measured BLER actually experienced by the UE. System simulations show that using a scheduling delay of 8 TTIs in UL optimizes the link adaptation performance because it uses the high correlation level of the interference measured on TTI n and TTI n+8 due to HARQ retransmissions.

Depending on the grants load PDCCH is configured on 1, 2 or 3 OFDM symbols. This can be increased up to 4 OFDM symbols in narrow system bandwidth of less than 10 PRBs. There can be at most 2 OFDM symbols in MBSFN subframes. In a dimensioning analysis assume a high scheduled user load and three OFDM symbols for PDCCH in macrocell scenarios. Only one OFDM symbol is the target for femto/pico-cell scenarios. The DCI format of a user equipment is used in accordance with its configured transmission scheme. For each transmission scheme the eNB has the capability to fall-back to DCI format 1A which is smaller. This provides further flexibility in addressing high PDCCH load. A UE is configured a minimum required CCE aggregation level depending on its DL radio link quality. The DL radio link quality is derived from averaging wideband CQI reports and/or RSRP measurements. Thresholds are used to determine the minimum aggregation level of a UE as a function of its DL SINR.

The PDCCH mapping function is called by both DL and UL schedulers for every new allocation attempt. The approach taken in the scheduler of this invention performs individual allocation requests to PDCCH. Any time a UL of DL schedule is done for a user a PDCCH allocation is also made for that user. If the user fails to be allocated, scheduler can immediately get back to the next best candidate for this PRB or RBG. Thus no hole in the spectrum which is thus fully utilized. The drawback is a potential higher blocking rate compared with an approach where a group of UEs is presented together to the PDCCH. This second approach ties all allocation combinations and selects the one that minimizes the number of blocked UEs. This second approach may result in blocked allocations leaving in holes in the spectrum.

PDCCH mapping involves the following principles. Assume that the total number of CCEs available for dynamic DCI allocations is 84−16=64, where 16 is the number of CCEs in CSS which are reserved for signaling and prioritized use. Allocations can be cost-based CCE allocations or no-cost allocations. Cost-based CCE allocation first computes a cost for each available CCE at the n-th subframe $C_i(n)$, where i=16, . . . , 83 is the logical CCE index excluding CSS and n=0, 1, . . . , 9 is the subframe index. The cost $C_i(n)$ is defined as $$C_i(n) = \sum_{j \in S(n)} A_{i,j}(n) \quad (10)$$

where: S(n) is the set of active UEs at the n-th subframe; and $A_{i,j}(n)$ is the cost of user j associated with the i-th CCE at the n-th subframe. The cost $A_{i,j}(n)$ is zero if the i-th CCE is not in the j-th user's USS. Otherwise this set to 1 for fixed cost and to the j-th user's CCE aggregation level for weighted cost. The cost of multiple CCEs is the sum of the costs of each CCE. A UE may have its grant allocated on different CCE combinations in its USS depending on its minimum required aggregation level. For cost-based allocations, the available CCE combination in the UEs USS which has the smallest cost is selected. For non cost-based CCE allocation the first available CCE combination is selected. Once a CCE is allocated it is labeled as unavailable by assigning an infinite cost. Each active UE only uses the CCEs at the minimum required aggregation level in its USS. If a UEs USS at its minimum required aggregation level lies within CSS and if its minimum required aggregation level is less than 8, the UE is allowed to use its USS at the next larger aggregation level.

Figure 9A:
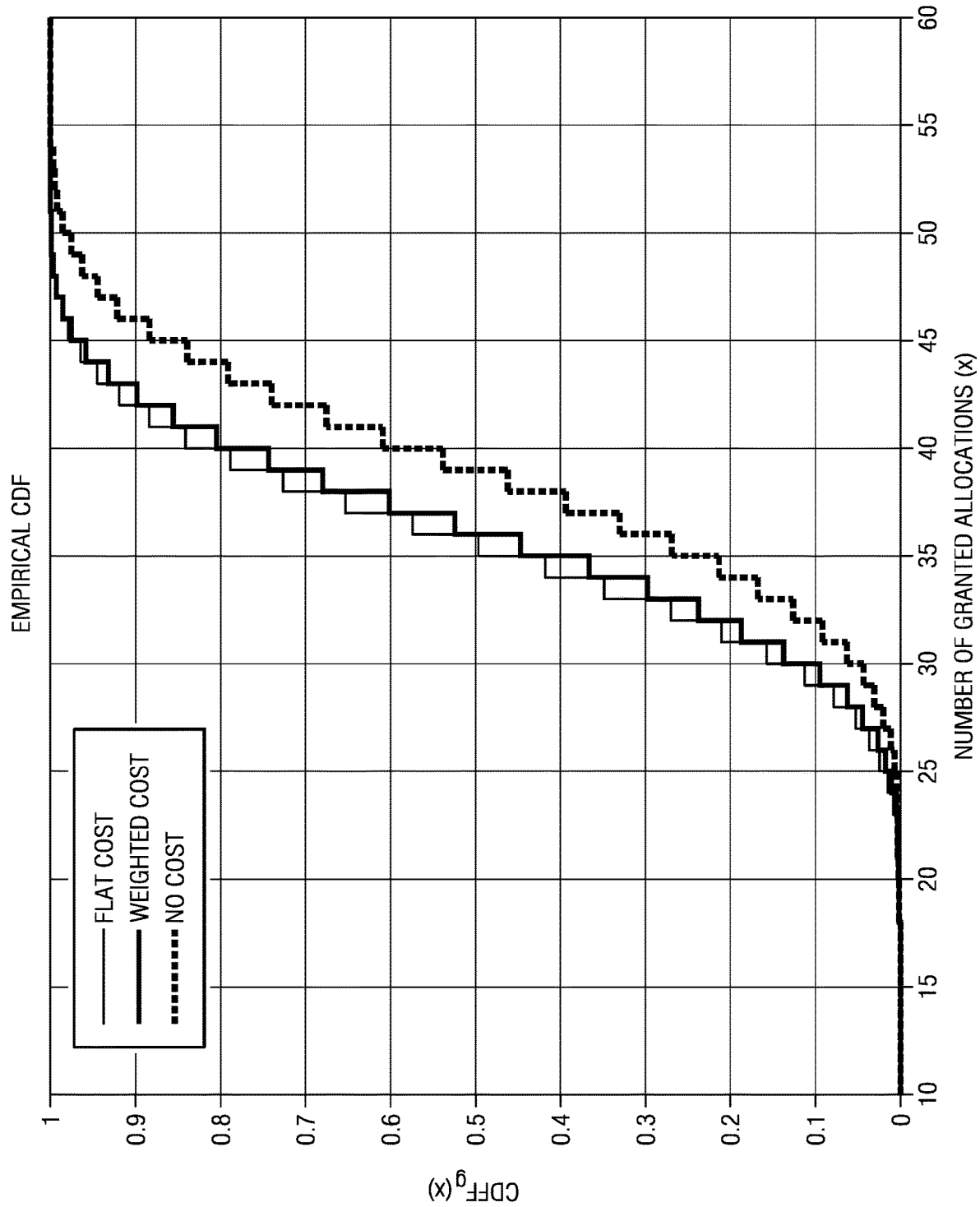
FIG. 9A illustrates the CDF of granted allocation number for aggregation distribution type 3.
Figure 9B:
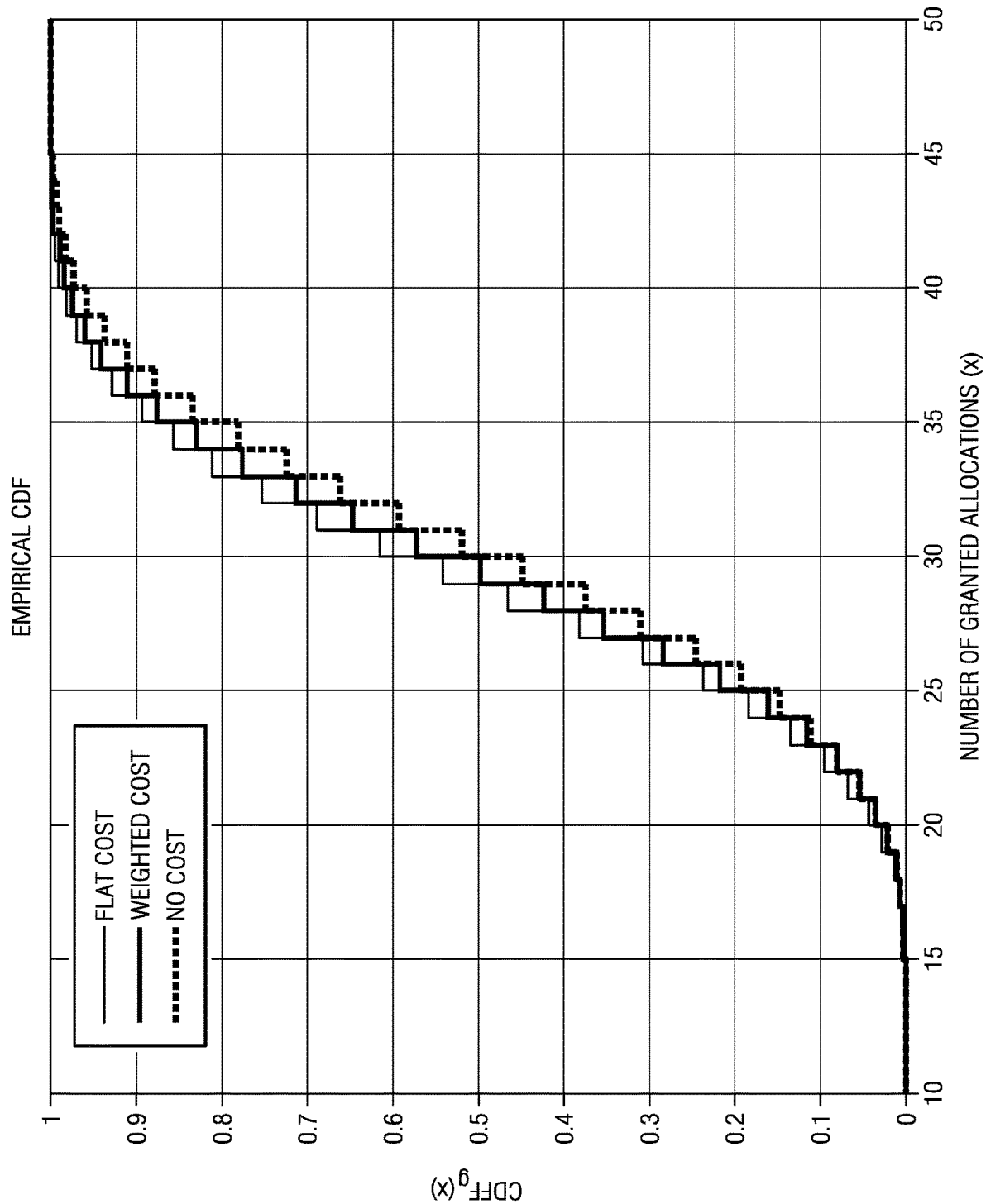
FIG. 9B illustrates the CDF of granted allocation number for aggregation distribution type 4.
Figure 10A:
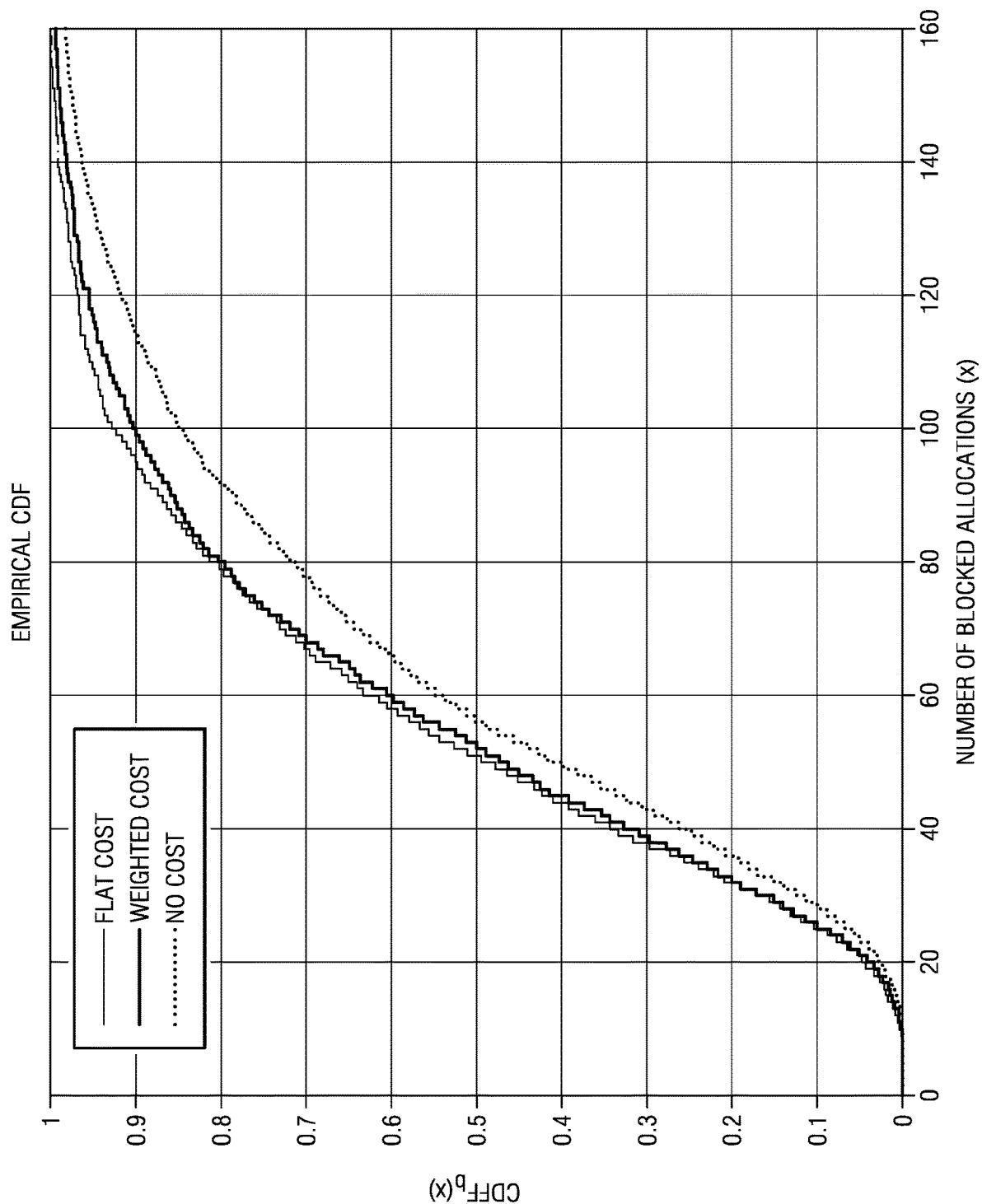
FIG. 10A illustrates the CDF of blocked allocation number for aggregation distribution type 3.
Figure 10B:
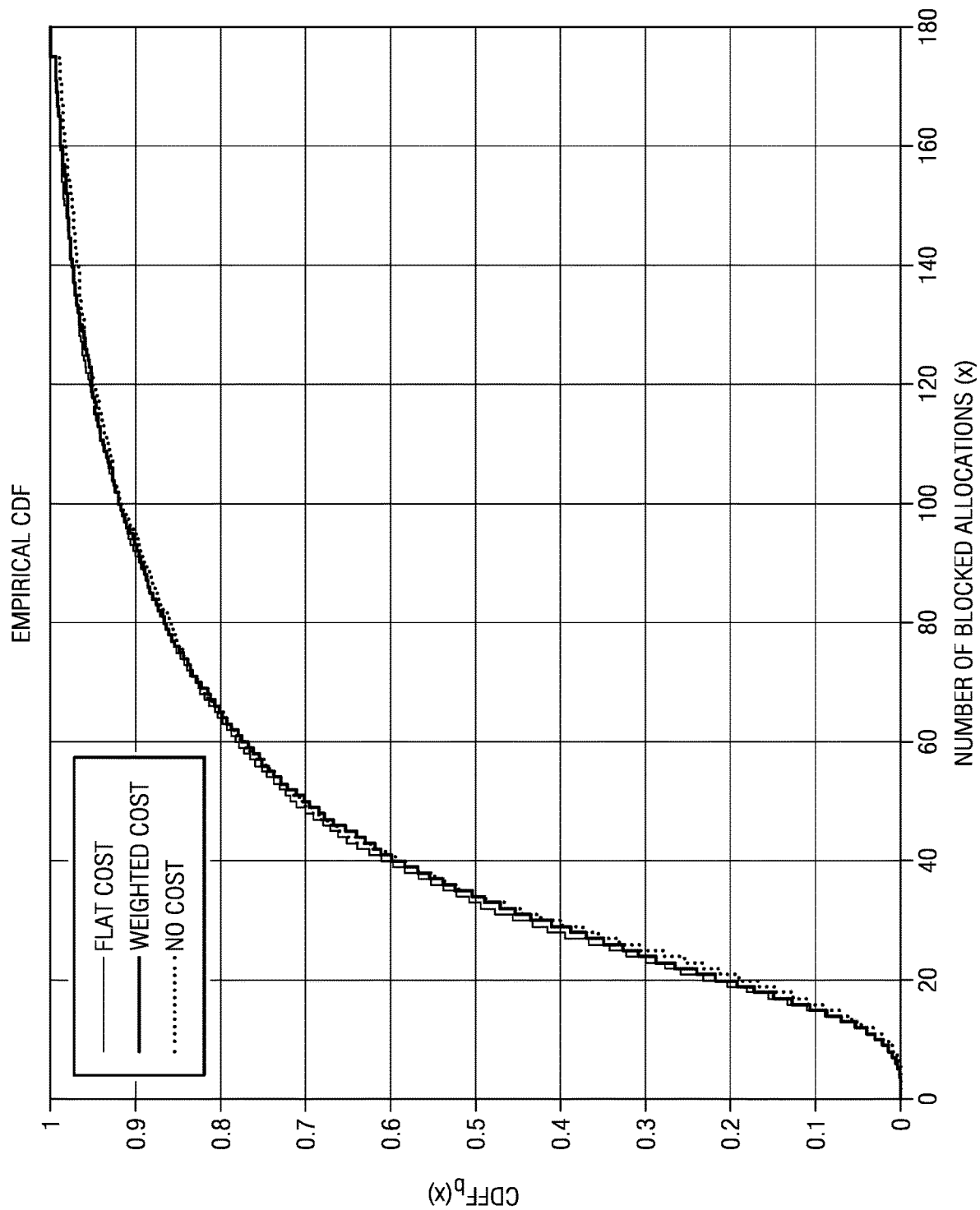
FIG. 10B illustrates the CDF of blocked allocation number aggregation distribution type 4.

CDF statistics are collected through simulations for both granted allocations and blocked allocations. For each TTI, the simulation loops over UEs and attempts to allocate each UE on PDCCH with the above algorithm. The attempts may be successful (granted allocation) or not (blocked allocation). When the PDCCH is full, the algorithm starts again on the next TTI. The number of granted allocations is the number of grants allocated in a TTI. The CDF curve of FIG. 9 indicates that with a fixed number of 68 total available CCEs for 200 active UEs with the a priori knowledge of their minimum required CCE aggregation levels, the distribution of the number of grants that could be allocated. The number of blocked allocations is the number of allocation requests blocked. The blockage CDF curve in FIG. 10 is based on that of granted allocations for a target number of grants. With a fixed number of 68 total available CCEs for 200 active UEs with a priori knowledge of their minimum required CCE aggregation levels, the distribution of the number of blocked requests for a target number of grants. For a reasonably good distribution of UE CCE aggregation levels, the cost-based allocation approach tries to reduce the blockage rate at the cost of allocations granted.

The simulation parameters are 200 active UEs with 16-bit random RNTIs in 1000 random trials. For simplicity the cost arrays Ci(n) are pre-computed for all active UEs for each subframe index. There is no per-TTI update on the set of active UEs during simulations. There are two types of CCE aggregation level distribution of UEs for 20 MHz and 1.732 Km ISD. For Type 3 this is 3 kmph, 47.6% at level 1, 27% at level 2, 19.2% at level 4 and 6.1% at level 8. For Type 4 this is 30 kmph, 30.1% at level 1, 26.4% at level 2, 25.2% at level 4 and 18.3% at level 8, 3 OFDM symbols. Number of CCEs: 84 with 16 reserved for signaling and other prioritized use. The average number of granted allocations is 29.9 for 3 kmph and 20.6 for 30 kmph for full CCE usage.

Due to the pseudo-random nature of UE USS distribution and their CCE levels there is a gain in blockage at the cost of less allocations while using the cost-based CCE allocation. Thus it is preferable not to use any cost, such as no-cost, due to associated complexity with any cost. The type of algorithm used for CCE allocation is configurable.

Figure 11A:
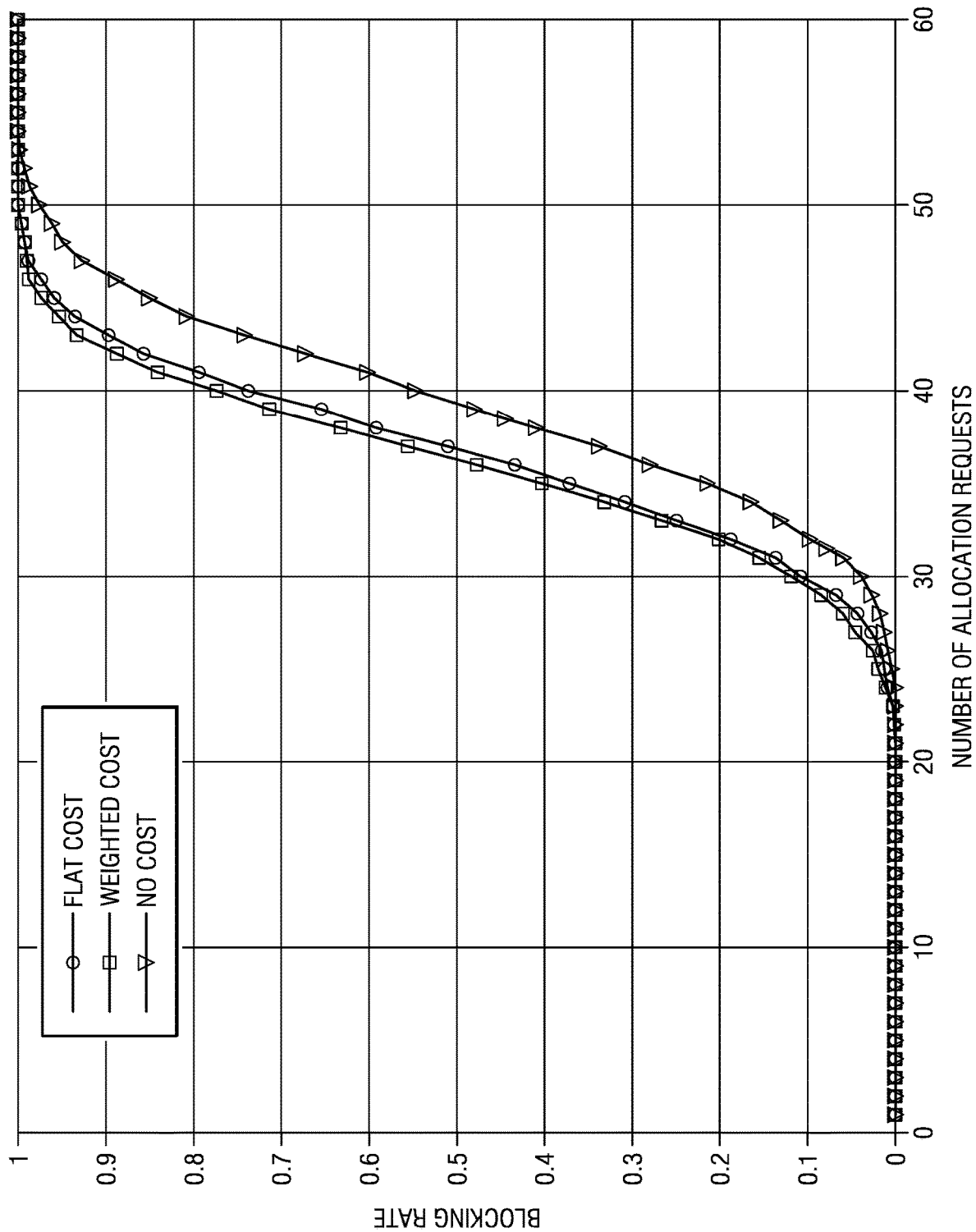
FIG. 11A illustrates the blocking rate versus number of allocation requests for aggregation distribution type 3.
Figure 11B:
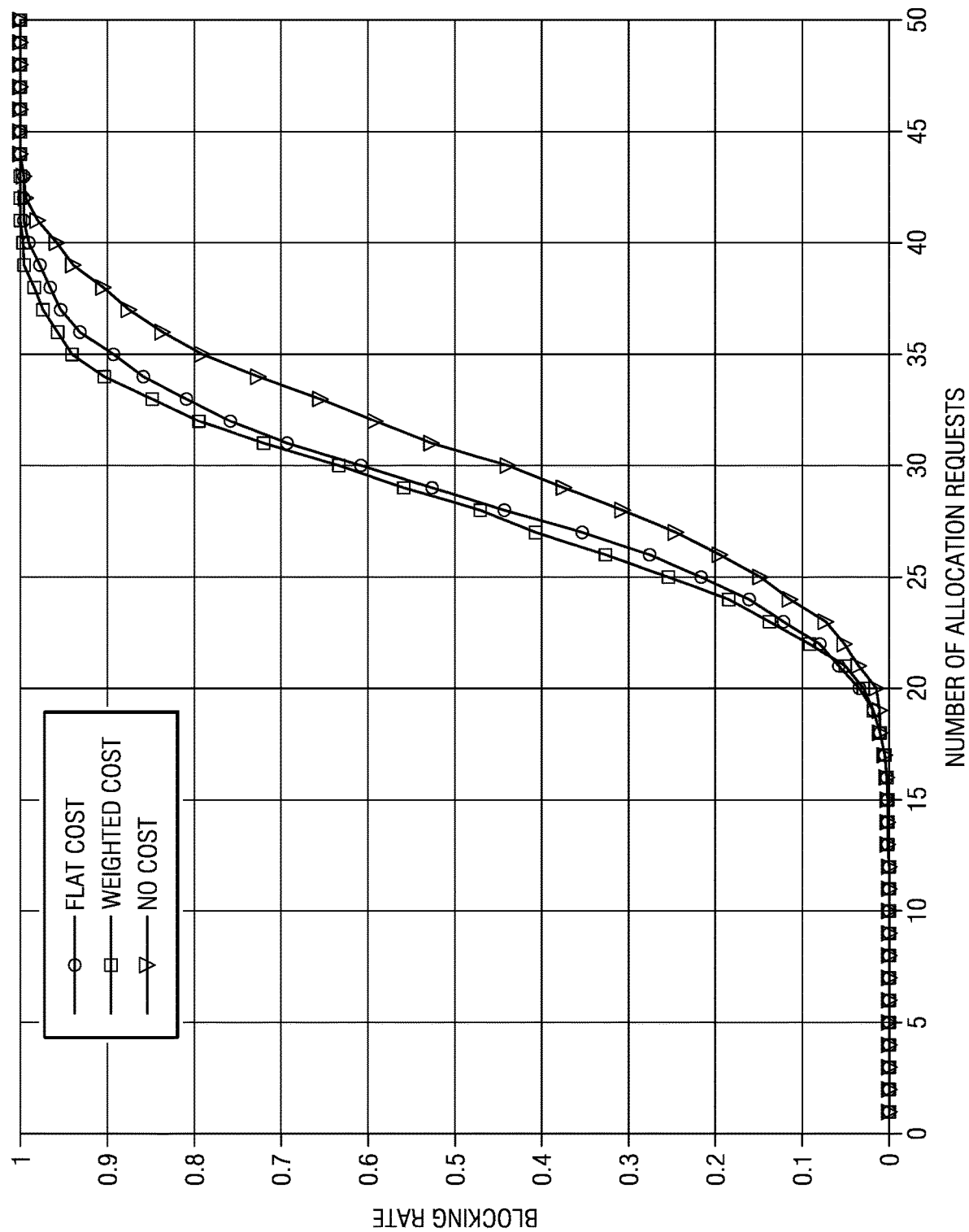
FIG. 11B illustrates the blocking rate versus the number of allocation requests for aggregation distribution type 4.

Finally FIG. 11 plots the blocking rate defined as the rate the algorithm is unable to have the given number of allocation requests (x-axis) in 1000 trials. This can be used to estimate the ratio of failed allocation attempts given a total number of targeted allocations per sub-frame and the number of OFDM symbols configured for PDCCH. With three OFDM symbols (current plots) in the worst-case (CCE aggregation level distribution type 4), less than 20% of the attempts are expected to be blocked when scheduler targets 24 allocations (12 UL and 12 DL) per sub-frame. With two and one OFDM symbols, the same blocking rate should be expected with 16 allocations (8 UL and 8 DL) and 8 allocations (4 UL and 4 DL) per sub-frame.

The following describes the details of SINR computation per tone depending on the receiver type (MRC, IRC, MU-MIMO) and averaging across a chunk b of M tones, $\gamma_{MMSE}$(b) There are two methods for SINR computation depending on what type of scheduling unit scheduler supports. These are: a fixed scheduling unit size also referred to Fixed Transmission Bandwidth (FTB); and a variable scheduling unit know as Adaptive Transmission Bandwidth (ATB). For FTB SINR is directly averaged from per-subcarrier to per scheduling unit (1-step) using Equation (17) below. The latter case typically addresses Recursive Maximum Expansion (RME) scheduling algorithms where different winners can have different allocation sizes, depending on the scheduling metric envelope shape. The envelope is computed with a small granularity, e.g. per-PRB, and for the simplest RME algorithm, the final averaging across allocated PRBs is only computed for the winners. TI implements an RME scheduler with configurable SINR granularity (down to per-PRB).

A user's scheduling metric associated with a frequency chunk hypothesis is derived from its SINR measurement at this frequency chunk, $\gamma_{MMSE}$(b), involving its channel vector $h_k$[m], the noise plus out-of-cell interference covariance matrix $R_{zz}$[m] and for MU-MIMO, the channel covariance matrixes $h_i$[m]$h_i^H$[m] of the potentially paired users over the M tones m of the chunk. The per-antenna per-tone channel estimation is performed at L1 on the SRS. The interference variance is estimated on the DMRS rather than the SRS. The DMRS is more representative of the noise and interference experienced by PUSCH. In interference-limited scenarios, the noise variance may be highly correlated across frequency tones. In this case the noise variance can be estimated on the DMRS in the same way as is estimated the user channel gain on the SRS. This uses the cyclic shifts of the DMRS sequence allocated to the neighboring sectors. In the case of noise-limited scenarios, the AWGN nature of the noise tone samples only allows estimating the average noise power across the M tones. An AWGN noise variance estimator is proposed on SRS and can be straightforwardly extended to DMRS. The channel vector $h_k$[m] of user k is only available on sub-frames where it has a scheduled SRS. This is not the case of the noise plus out-of-cell interference covariance matrix $R_{zz}$[m] which is measured on every available DMRS (or PUCCH) and can be updated at the sub-frame rate. For $\gamma_{MMSE}$(b) to always reflect the freshest measurements, it should be recomputed for each user on every sub-frame to account for the new interference measurement and potentially new channel measurement. One approach for solving the sparse availability of user's channel uses channel prediction. This invention uses a different approach aiming at reducing the scheduler complexity.

This invention is a 2-step SINR computation/link adaptation. This includes pre-scheduling and post-scheduling. Pre-scheduling computes SINR $\gamma_{MMSE}$(b) upon every new UEs SRS instance with per-chunk granularity by harmonic averaging across sub-carriers. A typical chunk size is one PRB and a sub-carrier decimation factor of up to 3 on top of the native 2 due to SRS comb structure can be tolerated without significant estimation loss. Pre-scheduling uses the channel vector $h_k$[m] and the noise plus out-of-cell interference covariance matrix $R_{zz}$[m] measured in this sub-frame. Link adaptation is performed based on $\gamma_{MMSE}$(b) to derive $r_{u,b}$(t) or the equivalent TBS. This is then further re-used as is by the SIMO and 1st stage MU-MIMO schedulers in subsequent sub-frames up to the next SRS instance of that user. Post-scheduling recomputes on every sub-frame for link adaptation purpose the SINRs $\gamma_{MMSE}$($B_k$) of the scheduled users k to take into account both the size of the final allocations $B_k$ and the freshest interference measurement.

Figure 12:
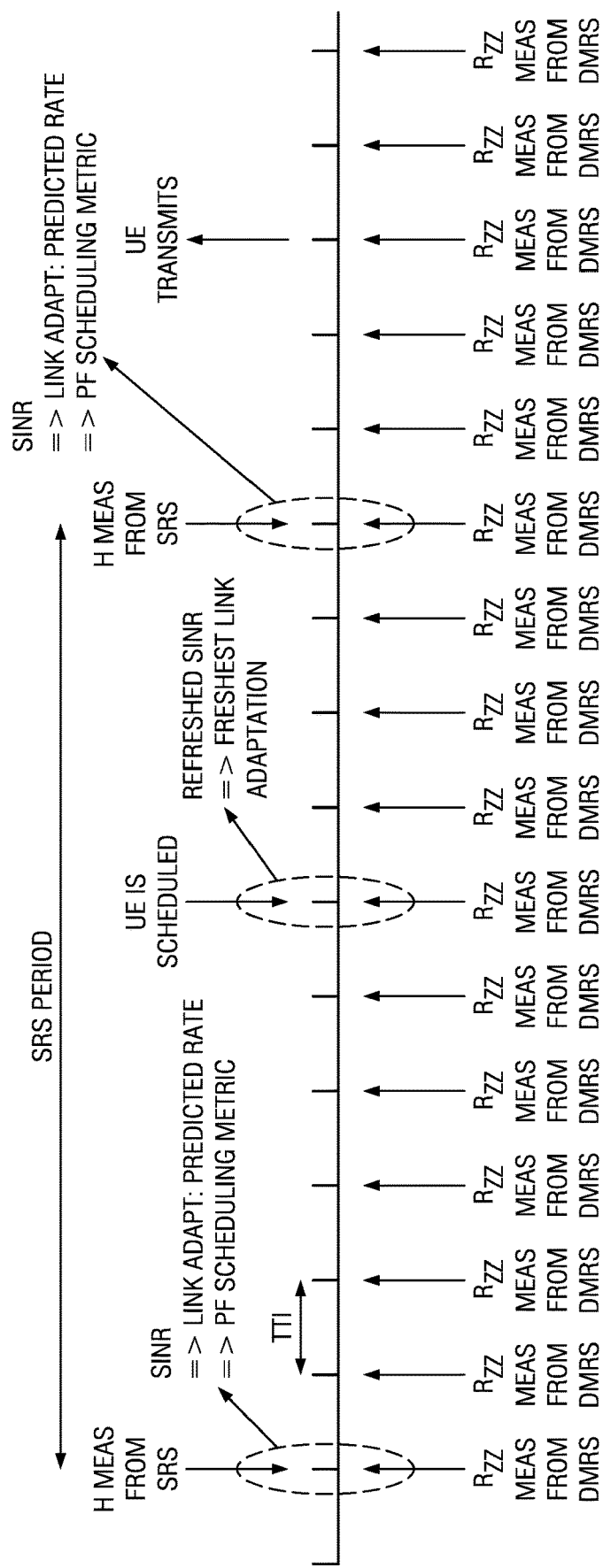
FIG. 12 illustrates the 2-step signal to interference and noise computation and link adaption.

FIG. 12 illustrates the principle of this 2-step SINR computation and link adaptation scheme.

Figure 13:
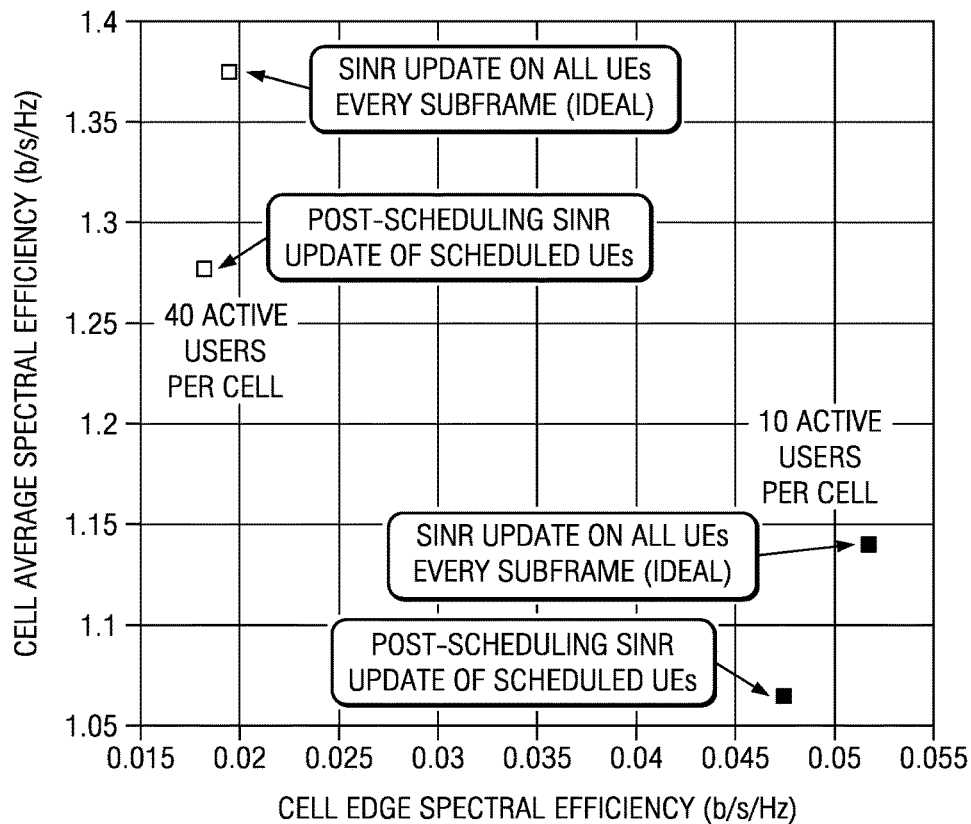
FIG. 13 illustrates the performance of the 2-step signal to interference and noise computation relative to an ideal case.
Figure 15:
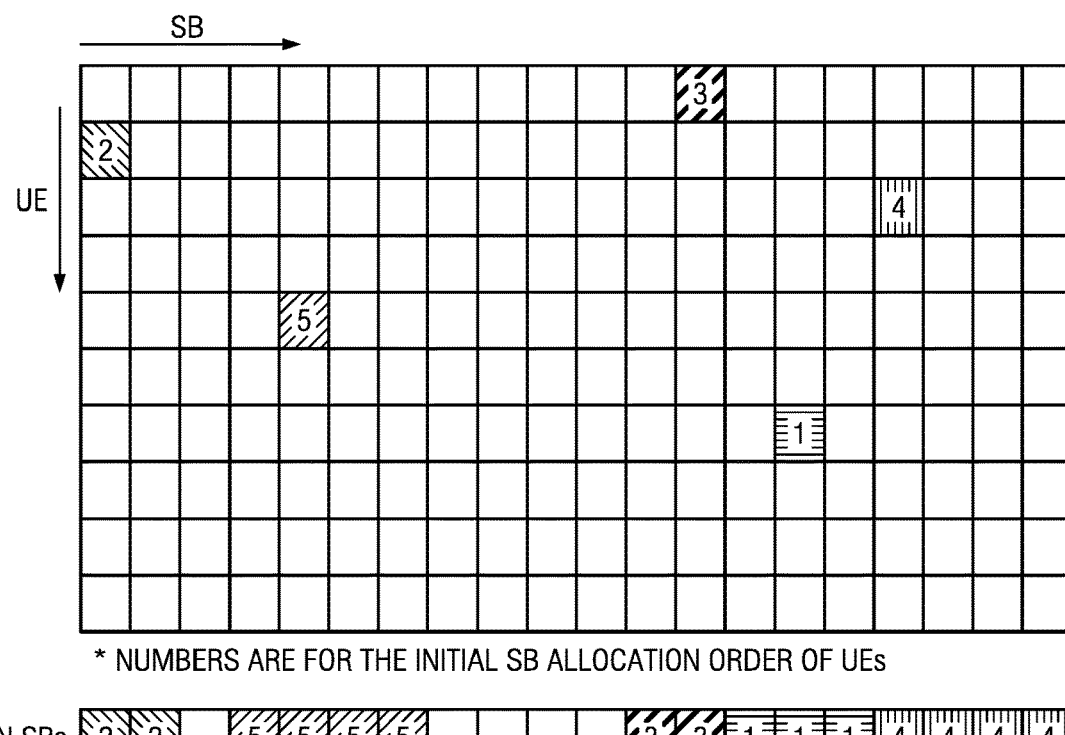
FIG. 15 illustrates the uplink scheduling unit allocation of the REM algorithm of this invention.

FIG. 13 shows that the spectral efficiency performance degradation of this 2-step SINR computation approach compared to always using the freshest interference is limited to about 7%.

TABLE 3

| System simulation parameters | |
| --- | --- |
| Numerology | 10 MHz (40 PRBs for PUSCH) |
| Test case | 3GPP case 1 |
| Cell Layout | Wrap-around with 21 cells |
| Active users per cell | 10-40 |
| Rx antennas | 2 |
| Channel model | SCM 3D Urban Macro |
| Channel estimation | Ideal + 1.5 dB penalty |
| UE speed | 3 km/h |
| Equalizer | MMSE w/t MRC |
| Traffic Model | Full Buffer |
| Scheduling delay | 8 ms |
| SRS period | 10 ms |
| Power Control | FPC with $P_{0\_PUSCH}$ = −86 dBm and $\alpha$ = 0.8 |
| Scheduler | PF/RME FDPS, no preselection |
| Allocation granularity | 1 PRBs |

To support 2nd stage MU-MIMO an intermediate step 1-$a$ is included which computes upon every new UEs SRS instance the channel covariance matrixes $h_i[m]h_i^H[m]$ for each tone m. This makes the channel covariance matrixes available for further computing the SINRs $\gamma_{MMSE}(B_k)$ of the pairing candidates in the 2nd stage from Equations (11), (12) and (13) below across the 1st stage allocated bandwidths Bk.

The following is a description of the SINR computation for LTE L2 UL scheduler. For generalized UL MU-MIMO the effective channel model for serving user k (k=1, . . . , K) over the m-th tone (m=0, . . . , (N−1)) is:

$$y_k[m] = h_k[m]x_k[m] + z[m] \quad (11)$$

where: channel vector $h_k[m]$ reflecting the average received power per tone of user k is of NR by 1 dimension; NR is the number of receive antennas; and the noise plus co-channel interference NR by 1 vector z[m] has an invertible NR×NR covariance matrix $R_{zz+hh_k}[m]$ expressed as:

$$R_{zz+hh_k}[m] = R_{zz}[m] + R_{hh_k}[m]; \quad (12)$$

where: $R_{zz}[m]$ is the noise plus out-of-cell interference covariance matrix defined as:

$$R_{zz}[m] = \sigma^2 I_{N_R} + \sum_{i \in other\ cells} h_i[m] h_i^H[m] \quad (13)$$

where: index i ranges across serving users of interfering cells over the m-th tone; $\sigma^2$ is the AWGN variance per tone; $R_{hh_k}[m]$ is the channel covariance matrix of the other multiplexed users but k; and K is the number of users spatially multiplexed over the m-th tone.

$$R_{hh_k}[m] = \sum_{i \ne k}^{K} h_i[m] h_i^H[m] \quad (14)$$

Two expressions exist for the SINR of MU-MIMO user k over the m-th tone:

$$\gamma_k[m] = h_k^H[m] R_{zz+hh_k}^{-1}[m] h_k[m] \quad (15)$$

and:

$$\gamma_k[m] = \frac{1}{[(I_K + H^H[m] R_{zz}^{-1}[m] H[m])^{-1}]_{k,k}} - 1 \quad (16)$$

where: H[m]=($h_1[m] h_2[m] \ldots h_K[m]$).

With DFT precoding over M tones, the effective SINR of the LMMSE receiver also referred to as harmonic averaging of per-tone SINRs is then:

$$\gamma_{MMSE} = \frac{\sum_{m=0}^{M-1} \frac{\gamma_k[m]}{\gamma_k[m]+1}}{M - \sum_{m=0}^{M-1} \frac{\gamma_k[m]}{\gamma_k[m]+1}} = \frac{1}{\frac{1}{M} \sum_{m=0}^{M} (\gamma_k[m]+1)^{-1}} - 1 \quad (17)$$

In the SIMO case, Equation (16) collapses into the one-dimension expression of Equation (15). This can be simplified to:

$$\gamma_k[m] = h_k^H[m] R_{zz}^{-1}[m] h_k[m] \quad (18)$$

The SINR expression of Equation (16) reflects an Interference Rejection Combining (IRC) technique for combining the interference across antennas and requires estimating and inverting the covariance matrix $R_{zz}[m]$.

Given the potentially large number of interferers i in $R_{zz}[m]$, a popular implementation assumes the interference is spatially white so that $R_{zz}[m]$ can be made a diagonal matrix $R_{zz}[m] = \text{diag}(\sigma_1^2[m], \sigma_2^2[m], \ldots, \sigma_{N_R}^2[m])$. In that case, $R_{zz}^{-1}[m] = \text{diag}(\sigma_1^{-2}[m], \sigma_2^{-2}[m], \ldots, \sigma_{N_R}^{-2}[m])$ and the SINR expression of Equation (18) further simplifies to:

$$\gamma_k[m] = \sum_{n=1}^{N_R} \frac{|h_{k,n}[m]|^2}{\sigma_n^2[m]} \quad (19)$$

where: $h_{k,n}$ is the channel vector component of user k associated to antenna n. This method reflects the Maximum Ratio Combining (MRC) technique across antennas. In the IRC case if $R_{zz}[m]$ is positive definite, it can be diagonalized through whitening filtering permitting the use of the simpler MRC technique. This requires inverting its lower-triangular Cholesky factor and thus does not result in a complexity reduction.

The SINR expressions of Equations (15) and (16) can be used to compute the MU-MIMO of spatially multiplexed serving user k over the m-th tone. If $R_{zz}[m]$ could still be approximated as diagonal, it is typically not the case for $R_{hh_k}[m]$.

The following is a description of the L1 to L2 interface in support of UL SINR computation. Assume the following measurements are available at L1 for each tone m: each UEs channel $h_i[m]$ and channel gain $|h_i[m]|^2$ estimates upon every SRS instance of that UE; and the out-of-cell interference covariance matrix $R_{zz_k}[m]$ (IRC) or just variance $\sigma_n^2[m]$ (MRC) on every sub-frame. There are two options for deploying the pre-scheduling SINR computations across L1 and L2. In the first option L1 only delivers per-tone SINRs $\gamma_k[m]$ and L2 computes per-chunk effective SINR $\gamma_{MMSE,k}(b)$. In the second option L1 computes and delivers to L2 per-chunk effective SINR $\gamma_{MMSE,k}(b)$.

For post-scheduling SINR computation L2 needs to resume SINR computation from per-tone SINR reflecting freshest interference measurement and to get final effective SINR $\gamma_{MMSE,k}(B_k)$ across user's allocation Bk. Hence, even with option 2 above, L1 must provide L2 with: each UEs channel vector $h_i[m]$ upon every SRS instance of that UE; and the out-of-cell interference covariance matrix $R_{zz}[m]$ on every sub-frame, for each tone m. The former also serves the 2nd stage MU-MIMO SINR computation.

The main difference between the frequency domain packet scheduler (FDPS) of LTE DL and UL is the contiguity constraint of the LTE-UL-specific localized SC-FDMA. Indeed, the optimal scheduler can easily be implemented in DL by running the decision process independently and subsequently on each RBG or RBG chunk. With the contiguity constraint the optimal scheduler is formulated as:

$$y(t) = \mathop{\mathrm{argmax}}_{\gamma} \sum_{i=1}^{N} \sum_{n=1}^{C} u'_i(\bar{r}_i(t))\mu_{i,n}(t)y_{i,n} \quad (20)$$

where: C is the total number of PRBs; and $y_i$ denotes a selection variable: $y_{i,n}=1$ if PRB n is assigned to user i, otherwise $y_{i,n}=0$ and is subject to:

$$y_{i,n} \in \{0, 1\} \quad (21)$$

$$\sum_{i=1}^{N} y_{i,n} \leq 1; n = 1, 2, \ldots, C$$

$$y_{i,n} - y_{i,(n+1)} + y_{i,m} \leq 1, m = n+2, n+3, \ldots, C \quad (22)$$

The inequality (21) limits the PRB to one user only. The inequality (23) enforces the LTE-UL specific requirement for consecutive blocks. The isolated local optimization of each PRB hardly optimizes the objective of equation (20). Thus users may need to be served with suboptimal metric value for some PRBs so as to optimize the global objective of equation (20). The exhaustive search of the maximum global metric of equation (20) across the space of all combinations of users/PRB s allocations $y_{i,n}$ under the contiguity constraint if in equality (22) is too complex for a practical implementation. The Recursive Maximum Expansion (RME) is one sub-optimal algorithm that provides a good performance complexity trade-off. The RME algorithm can be summarized as follows. In the following, the term of subband can be used interchangeably with scheduling unit. The algorithm produces a UE by Subband (SB) allocation table which closely follows the envelope of the UEs scheduling metrics by first picking the user with the highest metric. Then expanding its bandwidth as long as its metric is the highest. Then repeating with the next highest UE recursively. The bandwidth expansion also accounts for UEs potential power and packets amount limitation.

Figure 14A:
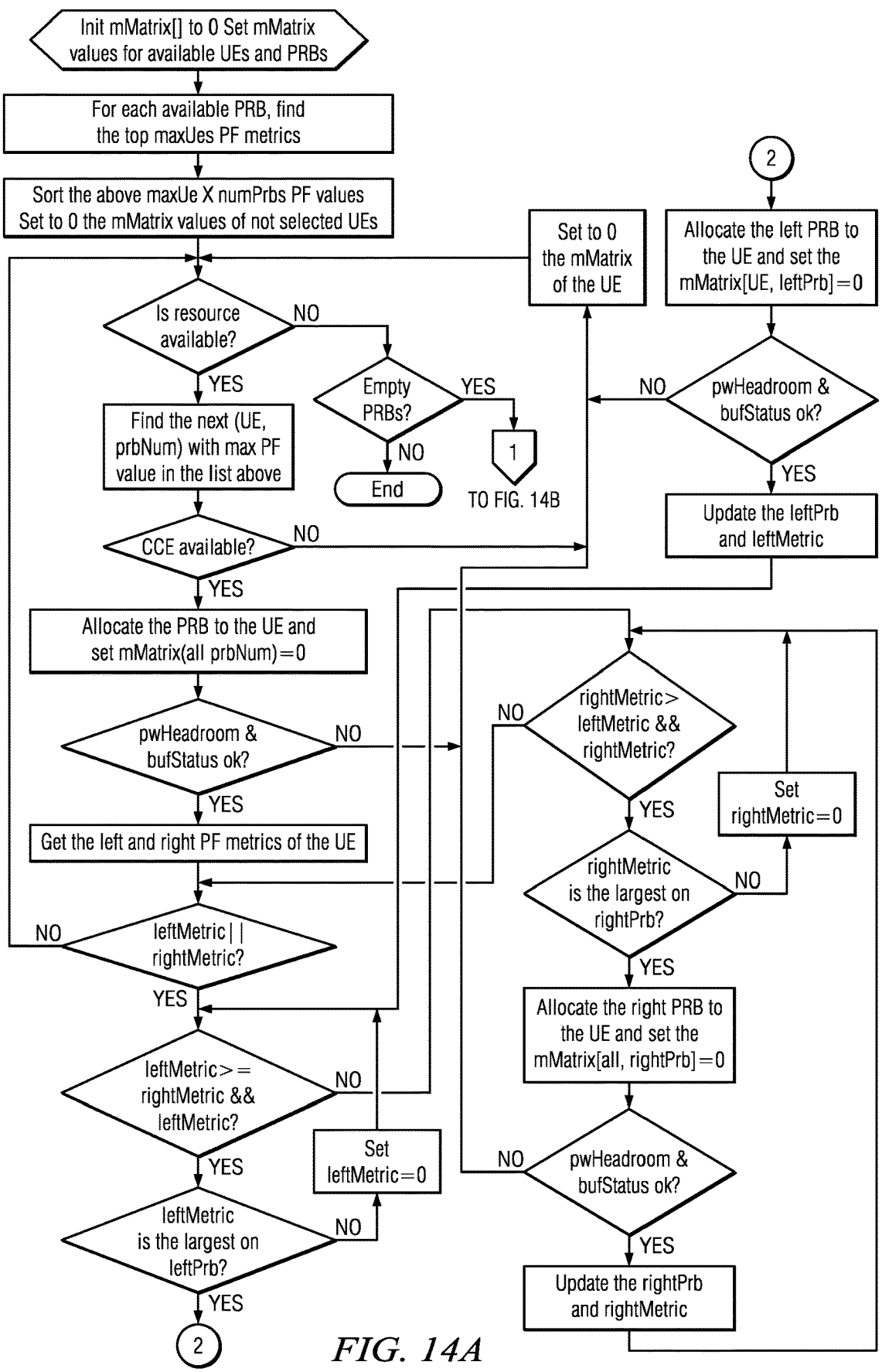
FIGS. 14A and 14B illustrate a flow chart of the Recursive Maximum Expansion algorithm of this invention.
Figure 14B:
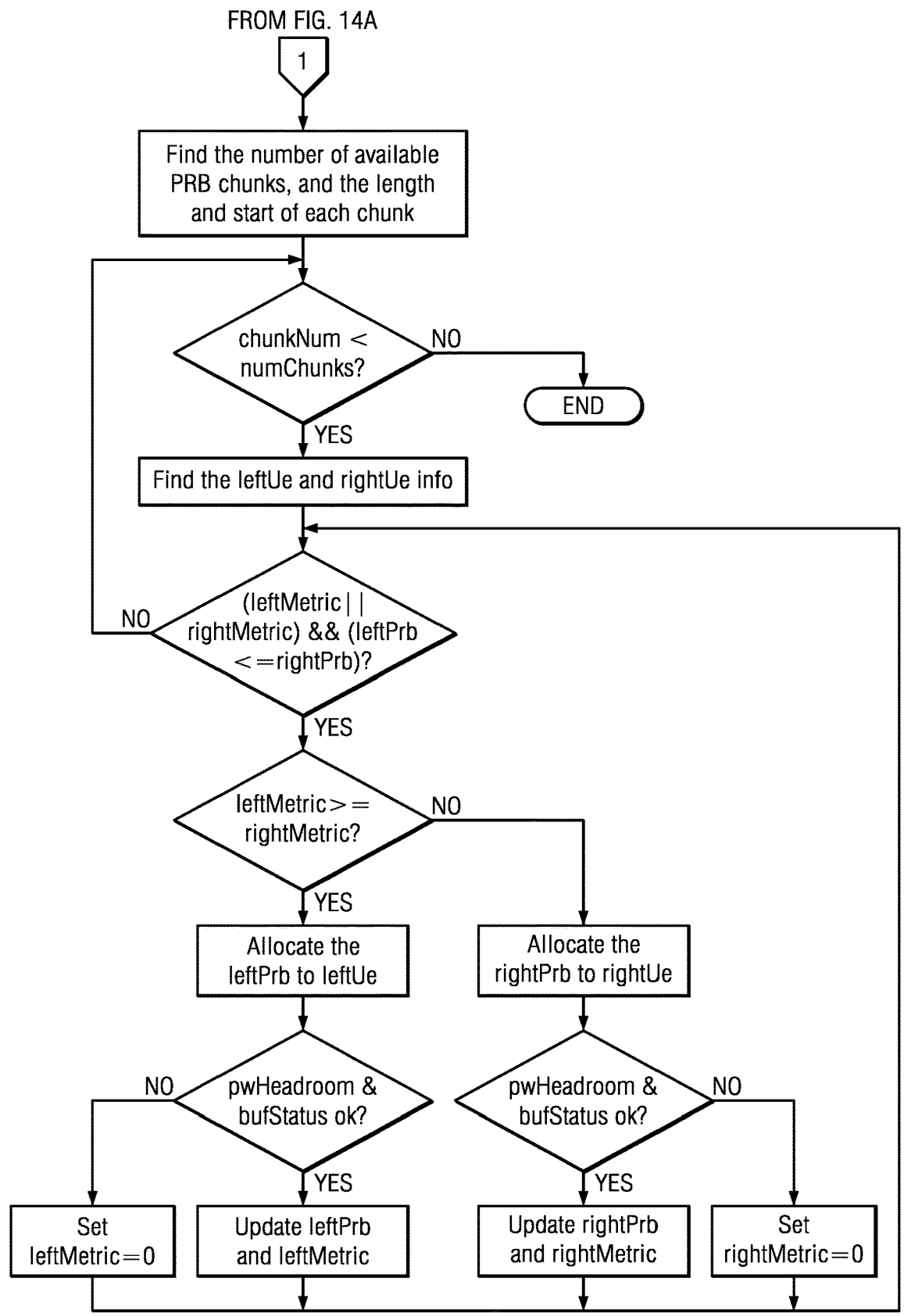

FIGS. 14A & 14B illustrate the RME implementation of this invention including a 2-step approach. The first step is an initial subband (SB) allocation and expansion. The second step is SB Gap filling.

The Subband (SB) size is $N_{SB}$ PRB. $N_{pre}$ UEs have been pre-selected. The process sorts the top $N_{best-UL}$ UEs among $N_{pre}$ per SB to produce two UE by SB tables. The first table provides the IDs of the sorted UEs. The second table provides the associated scheduling metric. Define the allocation loop as a series of allocation iterations. One allocation iteration is the process consisting of an attempt to allocate one UE on one or multiple SBs with the RME algorithm. An initial SB is allocated to the remaining UE with the maximum scheduling metric. Each allocation performs a recursive maximum expansion (RME) on both sides of the initial allocated SB. The outcome of one allocation iteration in the allocation loop always is disqualification of one UE for either of the following reasons. The allocation does not have a PDCCH resource which permanently disqualifies that TTI. The allocation is beaten by other remaining UEs with higher scheduling metrics on each side during the expansion which temporarily disqualifies that TTI. That TTI could be allocated again when filling empty remaining SBs. The allocation reaches its maximum power during the expansion which permanently disqualifies that TTI. For every expansion step the scheduler checks the remaining power headroom $PHR_{curr}$ of the UE by scaling linearly the last power headroom report $PHR_{meas}$ of the UE from the allocation size used for the measurement report $N_{PRB-meas}$ to the current tested allocation size $N_{PRB-curr}$:

$$PHR_{curr}=PHR_{meas}+10 \log 10(N_{PRB-meas})-10 \log 10(N_{PRB-curr}); (dB) \quad (23)$$

The allocation reaches its maximum buffer size during the expansion which permanently disqualifies that TTI. The amount of additional data estimated when expanding is either derived directly from the TBS estimated on this subband at first step of the SINR/link adaptation stage or can be more accurately assessed by running the second step link adaptation on every expansion step. The former is preferred in order to limit the complexity. After the first pass, unfilled SB holes can exist due to the constraints of scheduling grants, traffic patterns, or the power headrooms of target UEs. This is further addressed by the gap filling process.

Figure 16:
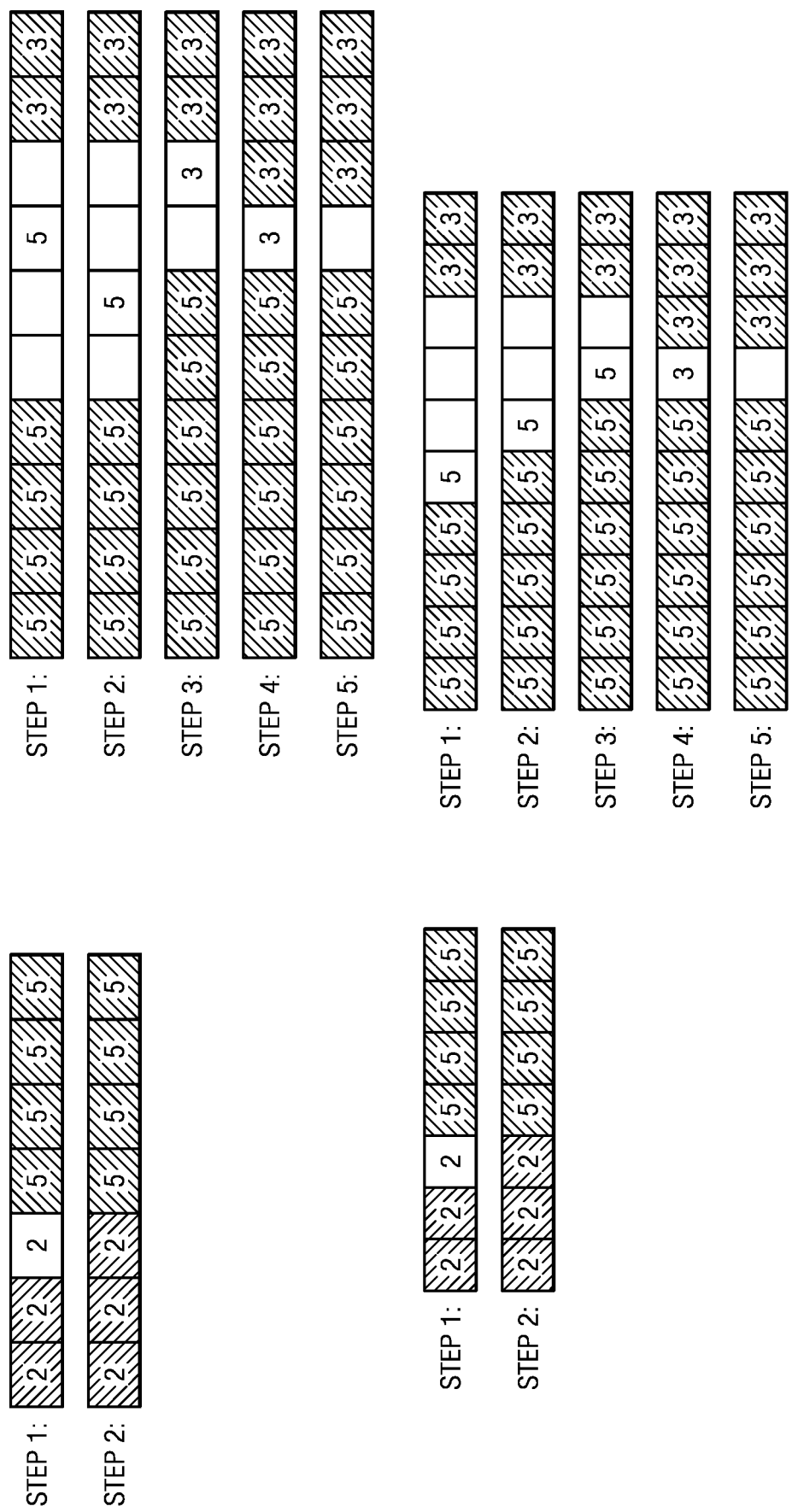
FIG. 16 illustrates the scheduling unit gap filling process of this invention.

FIG. 16 illustrates the SB Gap Filling process. For simplicity, the empty SB groups are filled sequentially in groups. In a first option called Maximum Subband First (MSF), the SB Gap Filling process finds the SB with maximum metric for two edge target UEs. The SB Gap Filling process checks if the SB of maximum metric can be covered by the PHR and buffered data of its target UE. If yes, the SB Gap Filling process allocates it to the target UE, otherwise the SB Gap Filling process goes to the next maximum (step 2 on the top right of FIG. 16). Once an SB is allocated, the SBs between it and the SB of the same UE must go to that UE for contiguous allocation (step 3 on the top right of FIG. 16). A second option called Higher Edge First (HEF) starts from two edge SBs, compares the metrics of their respective adjacent UEs and allocates the SB of higher metric to its edge UE. Each step checks for the power shortage (lower right of FIG. 16). This is the same as the first option for a one-SB gap. If there are 15 PDCCH resources, the allocation loop iterates at least 15 times. The allocation may loop more than 15 times due to CCE unavailable for some UEs.

Some UL transmissions are constrained by a pre-determined TBS which cannot be segmented. These are: HARQ adaptive retransmissions; and aperiodic CQI reports. For the latter, the TBS is fixed if the user does not have data in buffer, otherwise the constraint is of a minimum TBS. These (re)transmissions should be scheduled first and allocated onto PRBs where their SINR (or equivalently $r_{u,b}(t)$) is best. RME-like expansion is used, up to reaching the required TBS.

The following is an assessment of the type and number of sort selection processes involved in this algorithm as they drive the complexity requirements. Before entering the allocation loop there are two sort/selection processes. This first is pre-scheduling. The first step of pre-selection selects the top Npre out of the total number NA of active UEs with data in buffer based on a wideband metric. This involves only selection and does not sort the $N_{pre}$ best. This step may be skipped for small number of active users such as in pico cell scenarios. The second is in-scheduling. In-scheduling sorts the top $N_{best-UL}$ among $N_{pre}$ per SB. This gives the UE by SB tables. $N_{best-UL}$ is chosen based on the expected number of scheduled UEs per TTI in UL. For 8 targeted scheduled UEs, a $N_{best-UL}$ of 12 provides sufficient pad for blocked allocations with 20% blocking rate on average.

The process then sorts inside each allocation loop as follows. Every an allocation iteration searches for the maximum metric value across SBs in the top row of the UE by SB metric table. Every allocation iteration sets to zero the cells of the disqualified UE in the UE by SB metric table. Then in these columns, the first non-zero metric is promoted to the top row. The process then sets to zero the columns of the disqualified SBs in the UE by SB metric table. This approach is attractive because a sort of all metric values across SBs in the top row of the UE by SB metric table likely optimizes the search for the maximum metric value on every allocation iteration because only very few if any of these values will be updated after each allocation iteration.

Figure 17:
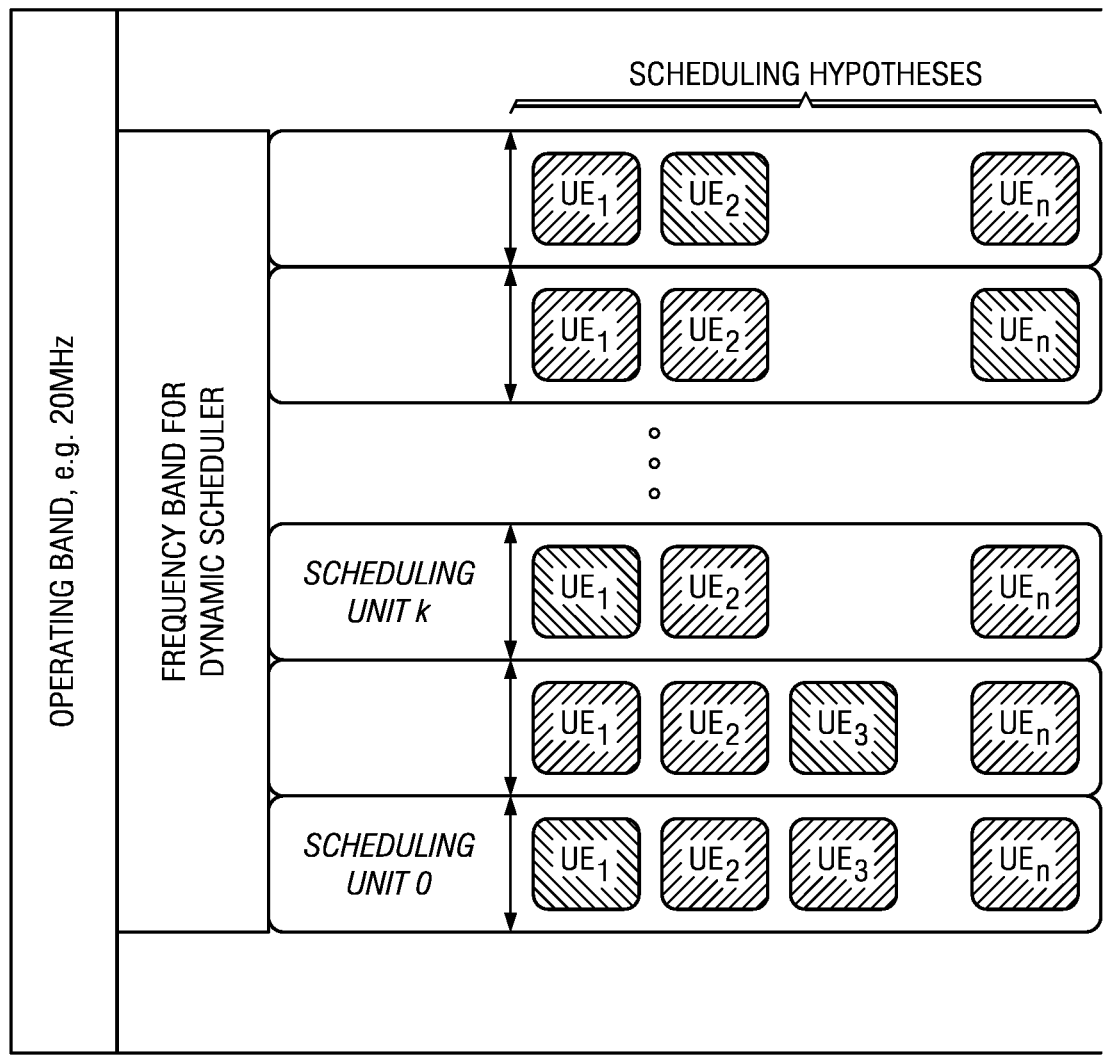
FIG. 17 illustrates a example single user downlink scheduling of this invention.

The DL scheduler unlike the UL scheduler is not restricted to allocating continuous PRBs to a UE. Neither is it restricted to power headroom limiting the allocation size. Thus the DL scheduler has a simpler design compared than the UL scheduler. The DL scheduler has the possibility of controlling each radio bearer independently unlike in UL. Thus the range of candidates in DL is larger than in UL. The DL scheduler is implemented along the following principles which are illustrated in FIG. 17.

The scheduling bandwidth is divided into scheduling units of size the CQI report granularity which is one RBG. The DL scheduler runs sequentially over the scheduling units and for each scheduling unit and for the set of active radio bearers. The DL scheduler uses the UEs CQI reports assuming UE-selected or higher layer configured sub-band feedback. The DL scheduler follows UEs MCS and MIMO configuration (for DL SU-MIMO) recommendations to compute a scheduling metric for each radio bearer. The DL scheduler then searches and sorts the top $N_{best-DL}$ radio bearers according to their scheduling metrics. The DL scheduler attempts to allocate the best radio bearer/user to the PDCCH. When allocation fails, the DL scheduler falls back to the second best and lower iteratively. Upon PDCCH allocation success, the DL scheduler allocates the winning radio bearer/UE to the scheduling unit. Thus the value of $N_{best-DL}$ shall be carefully chosen, similar to $N_{best-UL}$, based on the expected CCE allocation blocking rate.

During this process, a UE can be disqualified for further bidding for either of the following reasons. The UE does not have a PDCCH resource. The UE has reached the amount of data currently pending in its buffer.

To finish the DL scheduler: computes for each scheduled UE its final TBS and MCS, accounting for all RBGs allocated to its potentially multiple radio bearers; delivers its grants for PDCCH mapping; and triggers RLC/MAC to construct the MAC PDUs.

Some DL transmissions are constrained by a pre-determined TBS which cannot be segmented. These are: PCH; BCH1 RACH responses; HARQ adaptive retransmissions; and MAC control elements. For MAC control elements the TBS is fixed if the user does not have data in buffer, otherwise the TSM is limited to a minimum TBS. These (re)transmissions should be scheduled first and allocated onto RBGs where their SINR or equivalently $r_{u,b}(t)$ is best. As many best RBGs are selected up to reaching the required TBS.

In the case of the Random Access Response (RAR), the TBS is set to carry as many responses as detected signatures. The MCS should be chosen quite conservatively. Unless the UEs CQI is known a-priori, such as a contention-free signature in response to paging and the UE sustained CQI reports, the frequency allocation cannot rely on any a-priori DL channel knowledge. Thus the allocation could be done at any place such as at the edge of the scheduling bandwidth. In the most frequent case of single signature detection, the DL scheduler could choose an MCS based on the preamble group selected by that UE if preamble group selection is enabled in that cell. If the UE choses the preamble group corresponding to largest msg3 TBS, this indicates that the UE has sufficient data for using larger TBS than messageSizeGroupA but its measured pathloss also allows it to transmit.

Figure 18:
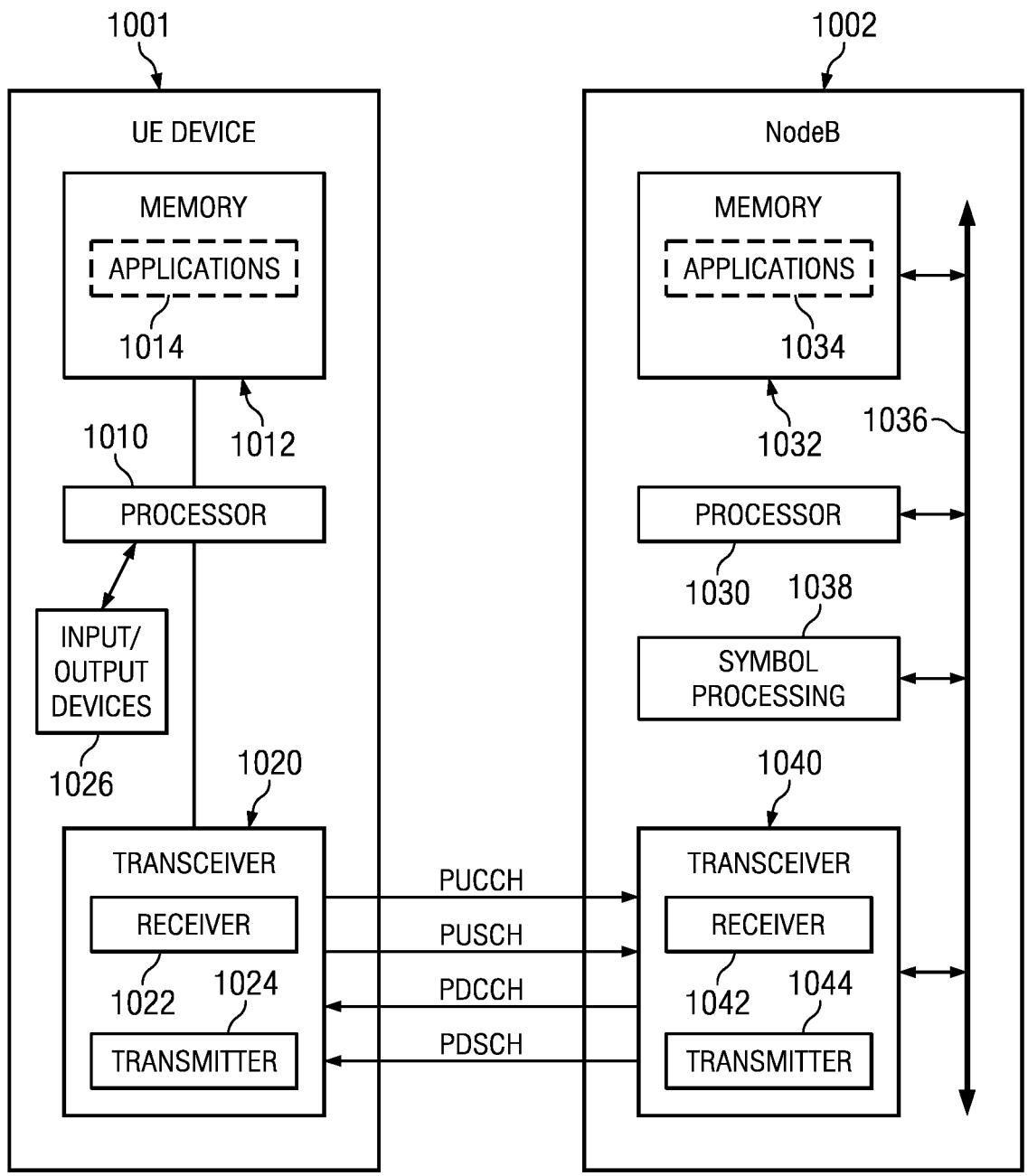
FIG. 18 is a block diagram illustrating internal details of a base station and a mobile user equipment in the network system of FIG. 1 suitable for implementing this invention.

FIG. 18 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

What is claimed is:

1. A method comprising:
    receiving a channel quality indicator from each of a plurality of user equipments, the channel quality indicator corresponding to a measured channel quality and being periodically transmitted; and
    scheduling communication with the at least one user equipment based on a channel quality indicator of the at least one user equipment using a 2-step Signal to Interference plus Noise Ratio computation and link adaptation procedure that includes a pre-scheduling computation and a post-scheduling computation.

2. The method of claim 1, wherein scheduling the communication includes scheduling uplink transmissions, wherein scheduling uplink transmissions includes:
    receiving a channel quality indicator for each physical resource block,
    computing a scheduling metric for each receiver type, and
    limiting a size of uplink allocation based on reported headroom and buffer size.

3. The method of claim 1, further comprising:
    each user equipment signaling a scheduling recommendation regarding Modulation and Coding Scheme and Multiple Input, Multiple Output configuration,
    wherein scheduling the communication includes scheduling downlink transmissions in response to the recommendations.

4. The method of claim 1, further comprising:
    transmitting a schedule via a Physical Downlink Control Channel.

5. The method of claim 1, wherein:
    scheduling the communication includes employing a minimum scheduling unit of an integer number ($N_{RB}$) of Physical Resource Blocks.

6. The method of claim 1, wherein:
    scheduling the communication includes estimating for a given channel quality information available at transmission interval n and on frequency chunk b which modulation and coding scheme (MCS) out of a fixed MCS set to assign to a user transmitting at transmission interval n+K, where K is an integer.

7. The method of claim 1, wherein:
    scheduling the communication includes, for each allocation, employing a Physical Downlink Control CHannel mapping function including computing a cost function for each Control Channel Element based on:

$$C_i(n) = \sum_{j \in S(n)} A_{i,j}(n)$$

where: $C_i(n)$ is the Control Channel element cost function to be calculated; $S(n)$ is the set of active UEs at the n-th subframe; and $A_{i,j}(n)$ is the cost of user j associated with the i-th CCE at the n-th subframe.

8. The method of claim 1, wherein the 2-step Signal to Interference plus Noise Ratio computation and link adaptation procedure includes:
    pre-scheduling by computing $\gamma_{MMSE}(b)$ upon every new UEs Sounding Reference Signal instance with per-chunk granularity by harmonic averaging across sub-carriers, where b is indicative of a scheduling unit; and
    post-scheduling on every sub-frame for link adaptation by recomputing $\gamma_{MMSE}(B_k)$ for each scheduled user equipment k taking into account both the size of the final allocations $B_k$ and the freshest interference measurement.

9. The method of claim 8, wherein:
pre-scheduling includes:
   calculating a per tone Signal to Interference plus Noise Ratio, and
   calculating a per-chunk effective Signal to Interference plus Noise Ratio $\gamma_{MMSE}(b)$.

10. The method of claim 1, wherein:
scheduling the communication includes a 2-step recursive maximum expansion calculation including:
   initial subband allocation and expansion, and
   subband gap filling.

11. The method of claim 10, wherein:
the subband gap filling is performed by maximum subband first including:
   finding the subband with a maximum metric for two edge target UEs,
   checking if the subband with the maximum metric can be covered by the PHR and buffered data of its target UE, and if so allocating that subband to the target UE, if not proceeding the next maximum subband, and
   upon allocation of a subband allocating the subbands between that subband and the subband of the same UE to that UE for contiguous allocation.

12. The method of claim 10, wherein:
the subband gap filling is performed by higher edge first including iteratively comparing the metrics of two edge subbands of respective adjacent UEs, allocating the subband having the higher metric to its edge UE, and checking for power shortage.

13. The method of claim 10, wherein:
scheduling the communication includes performing a 2-step recursive maximum expansion calculation wherein a special uplink communication is limited to a pre-determined transport block size that cannot be segmented including scheduling a special uplink communication first allocating such special uplink communication onto physical resource blocks with the best signal to interference and noise ratio.

14. The method of claim 1, wherein:
scheduling the communication includes scheduling downlink communication by:
   dividing the scheduling bandwidth into scheduling units of size the channel quality indicator report granularity,
   running sequentially over the scheduling units and for each scheduling unit and each set of active radio bearers,
   following user equipment recommendations to compute a scheduling metric for each radio bearer,
   sorting the scheduling metric the each radio bearers from best to worst,
   iteratively attempting to allocate physical downlink control channel to radio bearer/user equipment combinations from best to worst including:
      upon physical downlink control channel allocation success, allocating the winning radio bearer/user equipment combinations to the corresponding scheduling unit, and
      disqualifying a user equipment if the user equipment does not have a physical downlink control channel resource or if an amount of data currently pending in a user equipment buffer reaches the size, and
   computing for each scheduled user equipment a final transport buffer size and a modulation and coding scheme accounting for all radio bearer groups allocated to that user equipment,
   delivering the grants for physical downlink control channel mapping, and
   triggers radio link control/medium access control to construct the medium access control protocol data units.

15. A wireless communication system comprising:
at least one user equipment, each user equipment periodically measuring channel quality of communication and periodically transmitting a channel quality indicator corresponding to a measured channel quality;
a base station scheduling communication with said at least one user equipment based on the periodically transmitted channel quality indicators of the at least one user equipment using a 2-step Signal to Interference plus Noise Ratio computation and link adaptation procedure that includes a pre-scheduling computation and a post-scheduling computation.

16. The wireless communication system of claim 15, wherein:
said base station is further operable to schedule communication schedules uplink transmissions from a user equipment to the base station by
   receiving a channel quality indicator of each physical resource block,
   computing a scheduling metric for each receiver type, and
   limiting the size of uplink allocation based upon reported headroom and buffer size.

17. The wireless communication system of claim 15, wherein:
each user equipment is further operable to signal the base station a scheduling recommendation regarding Modulation and Coding Scheme and Multiple Input, Multiple Output configuration; and
said base station is further operable schedule communication schedules downlink transmissions from the base station to a user equipment in response to the recommendations.

18. The wireless communication system of claim 15, wherein:
said base station is further operable to
   transmit a schedule from the base station to a user equipment via a Physical Downlink Control CHannel;
   schedule communication with a user equipment by adapting Physical Downlink Control CHannel parameters and searching user equipment specific and common search spaces to allocate Control Channel Elements for Downlink Control Information messages.

19. The wireless communication system of claim 15, wherein:
said base station is further operable to schedule communication employing a minimum scheduling unit of an integer $N_{RB}$ of Physical Resource Blocks.

20. The wireless communication system of claim 15, wherein:
said base station is further operable to schedule communication estimates for a given channel quality information available at transmission interval n and on frequency chunk b which modulation and coding scheme (MCS) out of a fixed MCS set must be assigned to a user equipment transmitting at transmission interval n+K, where K is an integer.

21. The wireless communication system of claim 15, wherein:
said base station is further operable to schedule communication for each allocation employing a Physical Downlink Control CHannel mapping function including computing a cost function for each Control Channel Element by $$C_i(n) = \sum_{j \in S(n)} A_{i,j}(n)$$

where: $C_i(n)$ is the Control Channel element cost function to be calculated; $S(n)$ is the set of active UEs at the n-th subframe; and $A_{i,j}(n)$ is the cost of user j associated with the i-th CCE at the n-th subframe.

22. The wireless communication system of claim 15, wherein the 2-step Signal to Interference plus Noise Ratio computation and link adaptation procedure includes:
pre-scheduling by computing $\gamma_{MMSE}(b)$ upon every new UEs Sounding Reference Signal instance with per-chunk granularity by harmonic averaging across subcarriers, where b is indicative of a scheduling unit; and
post-scheduling on every sub-frame for link adaptation by recomputing $\gamma_{MMSE}(B_k)$ for each scheduled user equipment k taking into account both the size of the final allocations $B_k$ and the freshest interference measurement.

23. The wireless communication system of claim 22, wherein:
said base station is further operable to pre-schedule by
calculating a per tone Signal to Interference plus Noise Ratio, and
calculating a per-chunk effective Signal to Interference plus Noise Ratio $\gamma_{MMSE}(b)$.

24. The wireless communication system of claim 15, wherein:
said base station is further operable to schedule communication including a 2-step recursive maximum expansion calculation including
initial subband allocation and expansion, and
subband gap filling.

25. The wireless communication system of claim 24, wherein:
said base station is further operable to subband gap fill by maximum subband first including
finding the subband with a maximum metric for two edge target user equipments,
checking if the subband with the maximum metric can be covered by the PHR and buffered data of its target user equipment, and if so allocating that subband to the target user equipment, if not proceeding the next maximum subband, and
upon allocation of a subband allocating the subbands between that subband and the subband of the same user equipment to that user equipment for contiguous allocation.

26. The wireless communication system of claim 24, wherein:
said base station is further operable to subband gap fill by higher edge first including iteratively
comparing the metrics of two edge subbands of respective adjacent user equipments,
allocating the subband having the higher metric to its edge user equipment, and
checking for power shortage.

27. The wireless communication system of claim 24, wherein:
said base station is further operable to schedule communication including 2-step recursive maximum expansion calculation wherein a special uplink communication is limited to a pre-determined transport block size that cannot be segmented including scheduling special uplink communication first allocating such special uplink communication onto physical resource blocks with the best signal to interference and noise ratio.

28. The wireless communication system of claim 15, wherein:
said base station is further operable to schedule communication schedules downlink communication by
dividing the scheduling bandwidth into scheduling units of size the channel quality indicator report granularity,
running sequentially over the scheduling units and for each scheduling unit and each set of active radio bearers,
following user equipment recommendations to compute a scheduling metric for each radio bearer,
sorting the scheduling metric the each radio bearers from best to worst,
iteratively attempting to allocate physical downlink control channel to radio bearer/user equipment combinations from best to worst including
upon physical downlink control channel allocation success, allocating the winning radio bearer/user equipment combinations to the corresponding scheduling unit, and
disqualifying a user equipment if the user equipment does not have a physical downlink control channel resource or if an amount of data currently pending in a user equipment buffer reaches the size, and
computing for each scheduled user equipment a final transport buffer size and a modulation and coding scheme accounting for all radio bearer groups allocated to that user equipment,
delivering the grants for physical downlink control channel mapping, and
triggers radio link control/medium access control to construct the medium access control protocol data units.

29. A base station configured to:
a base station scheduling communication with at least one user equipment based on periodically transmitted channel quality indicators of at least one user equipment using a 2-step Signal to Interference plus Noise Ratio computation and link adaptation procedure that includes a pre-scheduling computation and a post-scheduling computation.

30. The wireless communication system of claim 29, wherein:
said base station is further operable to schedule communication schedules uplink transmissions from a user equipment to the base station by
receiving a channel quality indicator of each physical resource block,
computing a scheduling metric for each receiver type, and
limiting the size of uplink allocation based upon reported headroom and buffer size.

31. The wireless communication system of claim 29, wherein:
said base station is further operable schedule communication schedules downlink transmissions from the base station to a user equipment in response to the recommendations.

32. The wireless communication system of claim 29, wherein:
said base station is further operable to
transmit a schedule from the base station to a user equipment via a Physical Downlink Control CHannel;
schedule communication with a user equipment by adapting Physical Downlink Control CHannel parameters and searching user equipment specific and common search spaces to allocate Control Channel Elements for Downlink Control Information messages.

33. The wireless communication system of claim 29, wherein:
said base station is further operable to schedule communication employing a minimum scheduling unit of an integer $N_{RB}$ of Physical Resource Blocks.

34. The wireless communication system of claim 29, wherein:
said base station is further operable to schedule communication estimates for a given channel quality information available at transmission interval n and on frequency chunk b which modulation and coding scheme (MCS) out of a fixed MCS set must be assigned to a user equipment transmitting at transmission interval n+K, where K is an integer.

35. The wireless communication system of claim 29, wherein:
said base station is further operable to schedule communication for each allocation employing a Physical Downlink Control CHannel mapping function including computing a cost function for each Control Channel Element by $$C_i(n) = \sum_{j \in S(n)} A_{i,j}(n)$$

where: $C_i(n)$ is the Control Channel element cost function to be calculated; S(n) is the set of active UEs at the n-th subframe; and $A_{i,j}(n)$ is the cost of user j associated with the i-th CCE at the n-th subframe.

36. The wireless communication system of claim 29, wherein:
the 2-step Signal to Interference plus Noise Ratio computation and link adaptation includes:
pre-scheduling by computing $\gamma_{MMSE}(b)$ upon every new UEs Sounding Reference Signal instance with per-chunk granularity by harmonic averaging across sub-carriers, where b is indicative of a scheduling unit; and
post-scheduling on every sub-frame for link adaptation by recomputing $\gamma_{MMSE}(B_k)$ for each scheduled user equipment k taking into account both the size of the final allocations $B_k$ and the freshest interference measurement.

37. The wireless communication system of claim 36, wherein:
said base station is further operable to pre-schedule by
calculating a per tone Signal to Interference plus Noise Ratio, and
calculating a per-chunk effective Signal to Interference plus Noise Ratio $\gamma_{MMSE}(b)$.

38. The wireless communication system of claim 29, wherein:
said base station is further operable to schedule communication including a 2-step recursive maximum expansion calculation including
initial subband allocation and expansion, and
subband gap filling.

39. The wireless communication system of claim 38, wherein:
said base station is further operable to subband gap fill by maximum subband first including
finding the subband with a maximum metric for two edge target user equipments,
checking if the subband with the maximum metric can be covered by the PHR and buffered data of its target user equipment, and if so allocating that subband to the target user equipment, if not proceeding the next maximum subband, and
upon allocation of a subband allocating the subands between that subband and the subband of the same user equipment to that user equipment for contiguous allocation.

40. The wireless communication system of claim 38, wherein:
said base station is further operable to subband gap fill by higher edge first including iteratively
comparing the metrics of two edge subbands of respective adjacent user equipments,
allocating the subband having the higher metric to its edge user equipment, and
checking for power shortage.

41. The wireless communication system of claim 38, wherein:
said base station is further operable to schedule communication including 2-step recursive maximum expansion calculation wherein a special uplink communication is limited to a pre-determined transport block size that cannot be segmented including scheduling special uplink communication first allocating such special uplink communication onto physical resource blocks with the best signal to interference and noise ratio.

42. The wireless communication system of claim 29, wherein:
said base station is further operable to schedule communication schedules downlink communication by
dividing the scheduling bandwidth into scheduling units of size the channel quality indicator report granularity,
running sequentially over the scheduling units and for each scheduling unit and each set of active radio bearers,
following user equipment recommendations to compute a scheduling metric for each radio bearer,
sorting the scheduling metric the each radio bearers from best to worst,
iteratively attempting to allocate physical downlink control channel to radio bearer/user equipment combinations from best to worst including upon physical downlink control channel allocation success, allocating the winning radio bearer/user equipment combinations to the corresponding scheduling unit, and disqualifying a user equipment if the user equipment does not have a physical downlink control channel resource or if an amount of data currently pending in a user equipment buffer reaches the size, and computing for each scheduled user equipment a final transport buffer size and a modulation and coding scheme accounting for all radio bearer groups allocated to that user equipment, delivering the grants for physical downlink control channel mapping, and triggers radio link control/medium access control to construct the medium access control protocol data units.

43. A wireless communication system comprising:

plurality of user equipment, each user equipment periodically measuring channel quality of communication and periodically transmitting a channel quality indicator corresponding to a measured channel quality, and to receive a communication scheduled using a 2-step Signal to Interference plus Noise Ratio computation and link adaptation procedure that includes a pre-scheduling computation and a post-scheduling computation.

44. The wireless communication system of claim 43, wherein:

each user equipment is further operable to signal the base station a scheduling recommendation regarding Modulation and Coding Scheme and Multiple Input, Multiple Output configuration.

* * * * *